US010217462B2

United States Patent
Sarikaya et al.

(10) Patent No.: US 10,217,462 B2
(45) Date of Patent: Feb. 26, 2019

(54) AUTOMATING NATURAL LANGUAGE TASK/DIALOG AUTHORING BY LEVERAGING EXISTING CONTENT

(71) Applicant: Microsoft Technology Licensing, LLC, Redmond, WA (US)

(72) Inventors: Ruhi Sarikaya, Redmond, WA (US); Vasiliy Radostev, Seatle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 15/253,592

(22) Filed: Aug. 31, 2016

(65) Prior Publication Data

US 2018/0061401 A1    Mar. 1, 2018

(51) Int. Cl.
| | | |
|---|---|---|
| *G10L 15/00* | (2013.01) | |
| *G10L 15/22* | (2006.01) | |
| *G06F 17/24* | (2006.01) | |
| *G10L 15/18* | (2013.01) | |
| *G06F 17/22* | (2006.01) | |
| *G06F 17/27* | (2006.01) | |
| *G10L 15/183* | (2013.01) | |
| *G06Q 10/00* | (2012.01) | |
| *G06F 17/30* | (2006.01) | |

(52) U.S. Cl.
CPC .......... *G10L 15/22* (2013.01); *G06F 17/2247* (2013.01); *G06F 17/243* (2013.01); *G06F 17/2705* (2013.01); *G06F 17/279* (2013.01); *G06F 17/2785* (2013.01); *G06F 17/30* (2013.01); *G06Q 10/30* (2013.01); *G10L 15/183* (2013.01); *G10L 15/1822* (2013.01)

(58) Field of Classification Search
CPC combination set(s) only.
See application file for complete search history.

(56) References Cited

U.S. PATENT DOCUMENTS

| | | | |
|---|---|---|---|
| 9,081,411 B2 | 7/2015 | Kalns et al. | |
| 9,318,108 B2 | 4/2016 | Gruber et al. | |
| 2006/0079201 A1 | 4/2006 | Chung et al. | |
| 2007/0250514 A1 | 10/2007 | Rajput et al. | |
| 2011/0119196 A1 | 5/2011 | Ventura et al. | |
| 2011/0301955 A1* | 12/2011 | Byrne .................. | G10L 15/22 704/251 |

(Continued)

FOREIGN PATENT DOCUMENTS

| | | |
|---|---|---|
| CA | 2792570 A1 | 7/2011 |
| WO | 2011088053 A3 | 7/2011 |

(Continued)

OTHER PUBLICATIONS

"Make an assistant for your computer in 5 minutes", Retrieved on: May 19, 2016, 11 pages. Available at: http://www.instructables.com/id/Make-an-assistant-for-your-computer-in-5-minutes/.

(Continued)

*Primary Examiner* — Vu B Hang

(57) ABSTRACT

Systems and methods for augmenting existing CU system to be used with content, such as a website. The content may be parsed to determine on or more actions that may be performed by a user who uses the content. These actions may then be compared to tasks of CU systems to identify potential matches. When a match is found, the CU system may be updated to include information.

18 Claims, 18 Drawing Sheets

(56) References Cited

U.S. PATENT DOCUMENTS

| | | |
|---|---|---|
| 2012/0016678 A1 | 1/2012 | Gruber et al. |
| 2012/0271676 A1 | 10/2012 | Aravamudan et al. |
| 2013/0275164 A1* | 10/2013 | Gruber .................. G10L 17/22 705/5 |
| 2014/0278413 A1 | 9/2014 | Pitschel et al. |
| 2014/0316948 A1 | 10/2014 | Williams |
| 2015/0067503 A1 | 3/2015 | Slayton et al. |
| 2015/0121216 A1 | 4/2015 | Brown et al. |

FOREIGN PATENT DOCUMENTS

| | | |
|---|---|---|
| WO | 2014113349 A1 | 7/2014 |
| WO | 2015187584 A1 | 12/2015 |

OTHER PUBLICATIONS

Slawski, Bill, "Selecting Entities On Sites And Performing Tasks On Them Through Google", Published on: Apr. 6, 2016, 12 pages. Available at: http://www.seobythesea.com/2016/04/selecting-entities-performing-tasks-google/.

"International Search Report and Written Opinion Issued in PCT Application No. PCT/US2017/049675", dated Nov. 28, 2017, 12 Pages.

* cited by examiner

Match page structure to domain defintion

Edit Task

| Task Definition | Triggers | Parameters | Resolvers | Validation Conditions | Final Action |

+ Parameter 1 [Name]

- Name ─ 1102
- Description ─ 1104
- Type ─ 1106
- Input Slot Tags ─ 1108
- Resolver ─ 1110
- Missing Value Dialog Act ─ 1112
- Disambiguation Dialog Act ─ 1114
- Unique Value? ─ 1116
- Confirmation Required? ─ 1118

+ Parameter 2 [Name]

Save

AUTOMATING NATURAL LANGUAGE TASK/DIALOG AUTHORING BY LEVERAGING EXISTING CONTENT

BACKGROUND

Conversational understanding systems allow users to vocally interact with a computing device. For example, a user may vocally query a computer to execute one or more tasks. Typically, such conversational understanding systems use one or more language understanding models to gather, based on the user's speech or conversation, a variety of information to identify the user's intent, and thereafter execute a task based on the identified intent. Tasks may include, for example, the execution of a query, the execution of an application hosted on the user's computing device or in a distributed network, interacting with a third-party application, or the display of information.

Typically, third-party application designers are responsible for designing their own language understanding models and dialogs in order to enable a user to vocally interact with the designer's application or web service. It is with respect to these and other general considerations that aspects have been made. Also, although relatively specific problems have been discussed, it should be understood that the aspects should not be limited to solving the specific problems identified in the background.

SUMMARY

In general terms, this disclosure is directed to automating the development of a user interface platform to enable a user to vocally interact with a website, web service, or other application. Aspects of the technology provide tools for augmenting pre-existing language understanding models for use with a website or application. For example, a pre-existing language understanding model may recognize a flexible set of verbal commands that correspond to one or more executable tasks and/or input parameters for those tasks. That set of flexible commands may be augmented, in aspects, for use in connection with an application or website.

Augmentation of a language understanding model may occur automatically (or partially automatically). A website or other application may have content, such as text or video, that may be parsed to determine whether the information included in the website or application closely corresponds to an existing language understanding model. Additionally, the functionality of the website or application may be analyzed to determine if the functionality corresponds to task of a Conversational Understanding system. For example, where a website includes language indicating that a user may use the website to perform tasks (such as ordering a pizza) and/or objects that indicate that a user may perform tasks (such as a clickable object that leads one to an ordering webpage), a task associated with a pre-existing conversational understanding system that already includes some functionality to assist a user in ordering may be adapted to be used with the website. For example, the actions that a user may execute using a website/application (such as ordering a pizza) may then be associated with pre-existing task and language understanding models that support the tasks (such as a model that already includes task of ordering food). Accordingly, aspects of this disclosure provide tools to identify functionality in an application or website and leverage pre-existing tasks and language understanding models (and associated canonicalization and resolution models) to enable a user to vocally interact with the website or application for task understanding and execution.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

FIG. 11 illustrates an example screenshot of the user interface authoring platform for conforming and editing suggested parameters.

DETAILED DESCRIPTION

Figure 1:
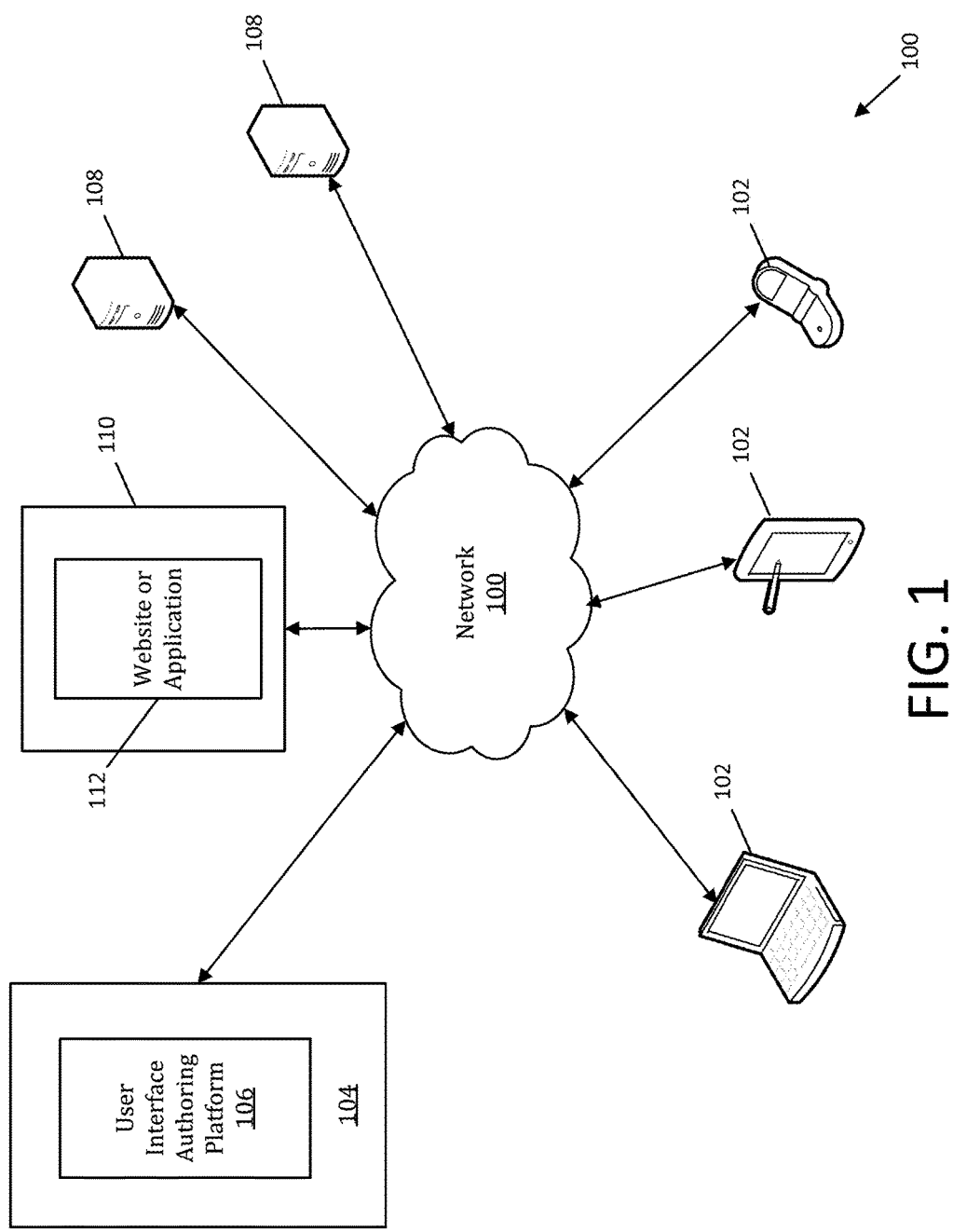
FIG. 1 illustrates a schematic block diagram of an example network useable for leveraging a website or application to author third-party experiences using a user interface platform.

Various aspects of the technology will be described in detail with reference to the drawings, wherein like reference numerals represent like parts and assemblies throughout the several views. Reference to various aspects of the technology does not limit the scope of the claims attached hereto. Additionally, any examples set forth in this specification are not intended to be limiting and merely set forth some of the many possible embodiments for the appended claims.

Aspects of the technology relate to leveraging an existing Conversational Understanding systems ("CU") and augmenting the CU systems to allow a user to vocally interact with a website or other application. CU systems assist users in performing various tasks. In aspects, CU systems simulate a conversation with a user, using, for example, spoken dialogue. This may occur by a user vocally asking a question and a CU system responding with an answer. The question and response is referred to herein as a "turn."

CU systems may be used to implement digital assistant applications, such as the CORTANA digital assistant application offered by Microsoft of Redmond, Washington. CU systems use language understanding ("LU") models to identify spoken words and tag words of importance or relevance to a particular task. Tasks include executing an action for a user (such as an interne search, the processing of a payment, entering information, display of results, execution of an application, procurement of third party services, etc.).

Many tasks use parameters that aid in the execution of the task. Parameters are containers that specify the entities that are collected and specify the semantic meaning of those entities within this task. Entities are representations of knowledge or understanding, for example a preference for "delivery" or "take-out" is an entity, which preferences may be represented by the text "delivery" and "take-out" respectfully. Additionally, an entity may be a specific address or a restaurant. One or more data structures may be used to represent a parameter and/or an entity. As an example, a task of reserving a taxi may require the fulfillment of parameters (i.e., slots) such as the start location, the time of pickup, and the number of passengers prior to execution of that task. As another example, the task of making a call using a phone application may require the fulfillment of parameters such as the name of the business or person to whom the call is directed or a phone number. As yet another example, the task of reserving a hotel may require the fulfillment of parameters such as the name of the city, the dates of the reservation, and an identification of the particular hotel. Tasks may further include optional parameters. For example, in the taxi example, optional parameters may be an identification of the destination location or the type of car desired. In a hotel example, optional parameters may be the star rating of a hotel or proximity to a certain area of the selected city. Such optional parameters are not required for task execution, but may assist the application responsible for executing the task to further refine the desired task to be executed.

The simulated conversation between the user and the CU system allows the CU system to obtain information. For example, the CU system may use one or more LU models to obtain, from the user, the information to a fulfill task. This includes both necessary parameters and/or optional parameters. Still further, the CU system maintains a record of the information obtained during the conversation with the user as it relates to the defined necessary and/or optional parameters to execute the task. Additionally, CU systems may infer information that is outside the simulated conversation, for example, by identifying the user's location or language requirements. In some aspects, the CU system may provide, to the user, the obtained information as a way of verifying the accuracy of the obtained information. For example, the CU system may display the obtained information to the user or may verbally identify the obtained information. This may provide the user with a confirmation of the CU system's understanding of the task and the corresponding obtained parameters. In aspects, CU systems may revise information obtained during the user conversation to address speech recognition or comprehension errors, language understanding errors, parameter resolution errors, or as requested by a user.

Additionally, the CU system may ask, via a voice or a text prompt, the user to provide further information that is necessary for task execution. For example, the CU system may have pre-defined or auto-generated prompts that elicit, from the user, further information or clarification to fulfill the required parameters necessary for task execution.

Still further, during the conversation, the CU system may provide the user with matching or suggested options, from which the user may select, for fulfillment of parameters prior to execution of the task. The CU system may provide to the user the information obtained during the conversation by, for example, displaying the gathered information on a display of the device or by, for example, reading aloud the gathered information. The CU system may further ask the user to confirm the accuracy of the provided information as a final step prior to task execution. At this point in the conversation, the user may, for example, confirm or edit the information or cancel execution of the task altogether. In an example, the user may confirm or edit the information by voice or gesture such as typing, touch, or movement of the device. Based on a confirmation response received from the user, the CU system may execute the identified task. Based on an information response received from the user, the CU system may repeat the conversation or seek selected information to be edited. Based on a cancellation response received from the user, the CU system may terminate the conversation and task execution process entirely.

Additionally, aspects disclosed herein provide a user interface authoring platform that automates and simplifies the task definition within one or more CU systems. This automation may, in aspects, occur in part by parsing an application or a website to identify one or more pre-existing language understanding, canonicalization, and/or resolution modules that likely will aid in the resolution of actions associated with the website or application. The systems and methods disclosed herein provide a tool that can be used to create an interface between the third-party-application and the CU system based in part on the information gathered from parsing the website or application. Although reference is made to a third-party application/websites and third-party/ websites application authors, the aspects provided herein may extend to any application/website or application/website author. Furthermore, because CU systems are complex and hard to design, the systems and methods disclosed herein provide the ability for third-party applications to make use of existing CU systems and models. Third-party application authors can therefore use the user interface authoring platform to efficiently and more simply confirm/ define tasks and leverage pre-existing language understanding models to identify those defined tasks.

FIG. 1 illustrates a schematic block diagram of an example network 100 useable for leveraging a website or application to author third-party experiences using a user interface platform. The network 100 includes one or more third-party computing devices 102, a server 104 hosting a user interface authoring platform 106, a database 108 storing, among others, language understanding models and canonicalization and resolution modules, and a server 110 hosting a website application 112. As illustrated, the third-party computing devices 102, the server 104, the database 108, and the server 110 are connected via a data communication network 100, such as the Internet.

Aspects described herein are directed to providing a user interface authoring platform 106 that leverages websites and/or application 112. In some aspects, the user interface authoring platform 106 operates remotely on the server 104, accessible by one or more third party client devices 102 via the data communication network 110. In other aspects, the user interface authoring platform 106 operates locally on the one or more third party client devices 102.

As will be described in further detail herein, the user interface authoring platform 106 is an authoring tool designed to provide third-party application authors with the ability to confirm suggested tasks and/or one or more language understanding models useable by the CU system to identify and execute a task. In aspects, suggestions regarding the CU system are provided in response to analyzing the website or application 112. In particular, the user interface authoring platform 106 guides third-party application authors to confirm (or define) a task (identified, in aspects, by parsing the website or application 112) in terms of the one or more required and even optional parameters necessary to complete the task. The user interface authoring platform 106 further provides the optional ability of an author to confirm/specify validation conditions, which define the one or more valid conditions that must exist among one or more parameters for task execution. Additionally, the user interface authoring platform 106 allows a third-party-application author to confirm, from the database 108, one or more language understanding ("LU") models that extract, from a user's speech or conversation, the information required to identify the appropriate task and to identify corresponding parameters. The LU models may be provided or suggested in response to analyzing the website or application 112. The LU models are used to annotate or analyze spoken or text input and may be directed to a specified domain. For example, an LU model may be specific to identifying utterances (e.g., speech or text input) relating to the task of booking restaurant reservations in a restaurant domain. A domain may be indicated by parsing the website or may be provided by an author. Such an LU model may be used to identify words or phrases to determine a user's intent as it relates to the particular domain and may also be used to fill the parameters of the task. For example, a particular LU model may be used for the task of booking restaurant reservations. Such an LU model could be applied to the spoken phrase "Is there availability for four people at Rohan's Mexican Restaurant tonight at 6:30?" to identify the task of making a restaurant reservation and to identify parameters such as the particular restaurant at which reservations are desired [Rohan's Mexican Restaurant], the number of people [four], and the time [6:30 PM], which may be required in order to execute the task.

The user interface authoring platform 106 provides the third-party application authors with the ability to select one or more preexisting LU models. In aspects, suggestions regarding LU are provided based on a parsing of the website or application 112. To the extent that an LU model does not already exist in the database 108, the user interface authoring platform 106 provides the third-party-application author with the ability to create one or more new LU models. The user interface authoring platform 106 further allows the third-party application author to confirm/select, from the database 108, one or more canonicalization or resolution models that transform user input into a standardized format. To the extent that a canonicalization or resolution module does not already exist in the database 108, the user interface authoring platform 108 allows the third-party-application author to create such modules.

Client device 102 may be any computing device, such as, for example, a cell phone, a personal digital assistant, a laptop, a desktop, or a tablet PC. The client device 102 hosts the intelligent digital assistant application, as described herein. Still further, the client device 102 stores one or more applications that can be executed thereon using the intelligent digital assistant application. Such applications may refer to, for example, applications that are provided with the device such as a phone application, an Internet browser application, an email application, a weather application, a note taking application, a text messaging application, a calendar application, a camera application, a map application, etc. Other third-party-applications may also be installed on the client device 102, such as, for example, a taxi cab reservation application, a hotel reservation application, a social media application, a gaming application, etc. Accordingly, a third-party-application author may, using the user interface authoring platform 106, create one or more tasks that execute a particular third-party-application installed on the client device 102.

Figure 2:
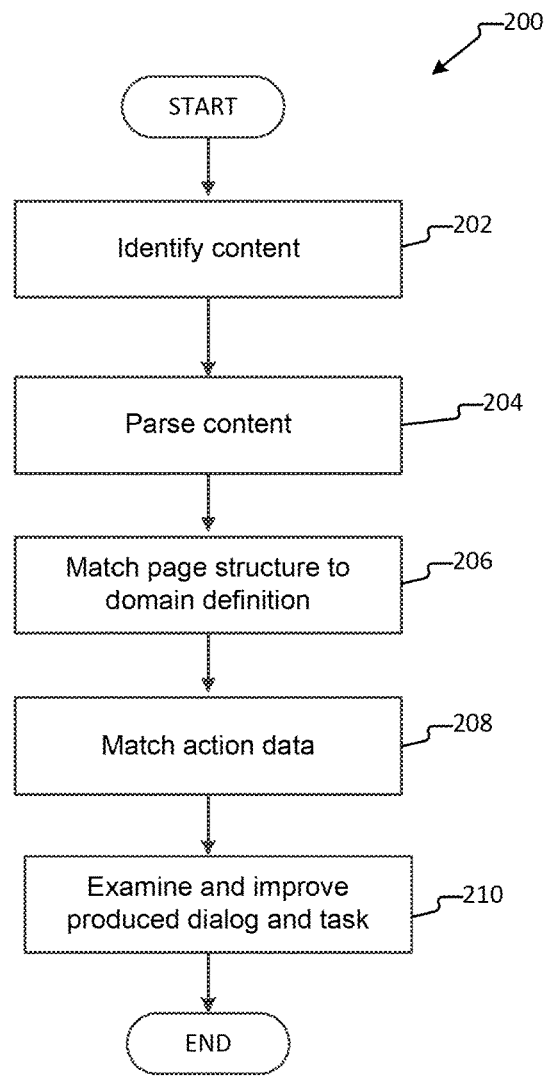
FIG. 2 illustrates an example method of parsing content, such as a website or application, to identify a potential CU system.
Figure 3:
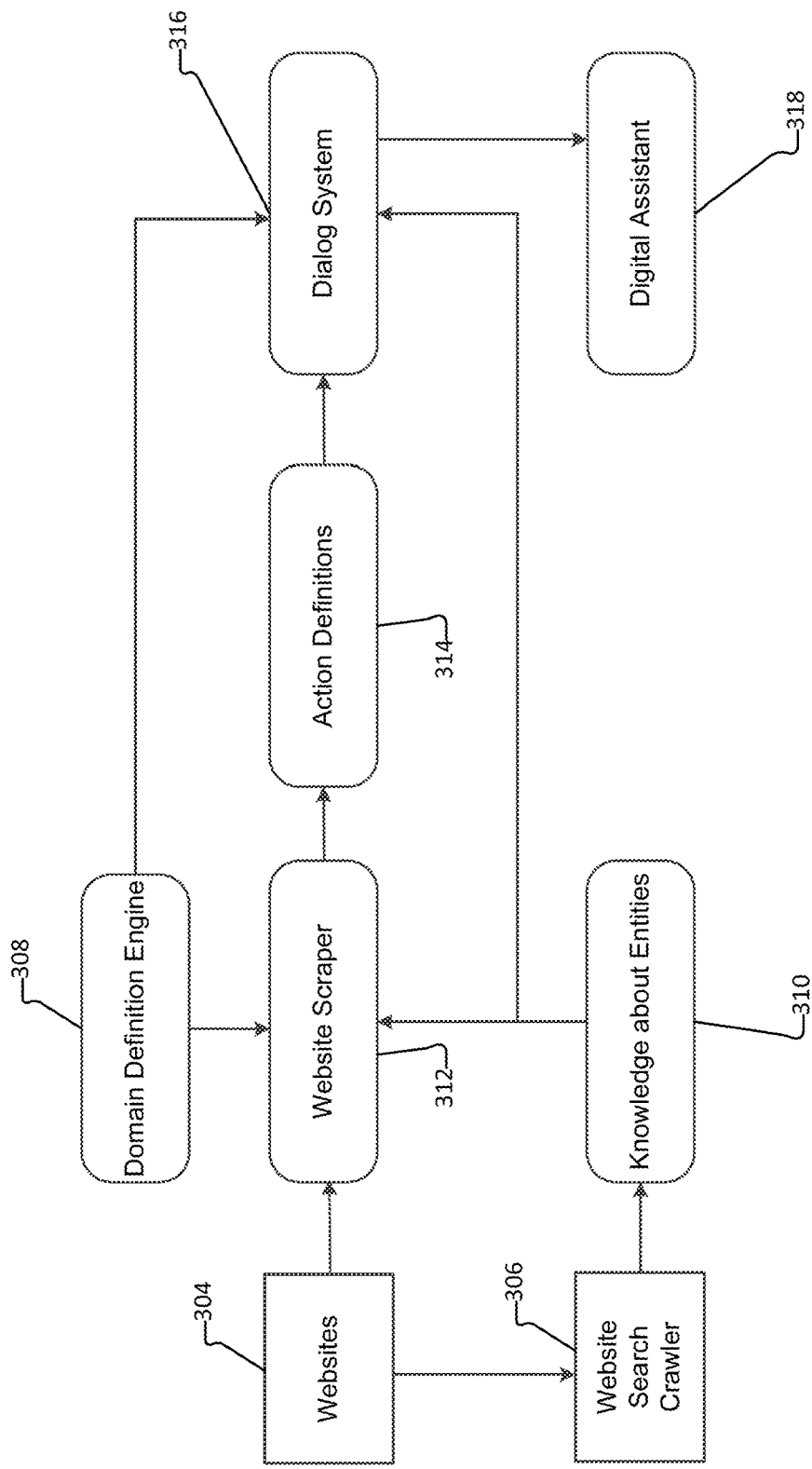
FIG. 3 illustrates an information flow.

FIG. 2 illustrates an example method 200 of parsing content, such as a website or application, to identify a potential CU system. Method 200 begins with identify content operation 202. In operation 202, content, such as a website, may be identified using the authoring platform 106. An author may do this in order to seed the authoring platform 106 with information sufficient to provide the author with suggested CU systems, LU models, tasks, parameters, dialog sets, and the like. Additionally or alternatively, a crawling mechanism may be used to find and identify potential websites to parse.

Method 200 continues to parse content operation 204. In parse content operation 204, the content is parsed to determine tasks and other information, such as parameters. The website may initially be prepared for parsing. This may occur by comparing the tags in a website with a list of tags (for example stored in database) that have been flagged as unnecessary. This includes, for example, header information website, or unnecessary metadata. That is, in aspects, the database may have a list of predefined tags (e.g., preprogrammed tags) that do not provide information sufficient to aid in detecting the semantic meaning of the content. As a specific example, a website may include tags in order to drive search engine traffic to the website (such as "Tony's pizza," "Tony's," "pizza," "New York," "New York pizza," "food," "thin crust," "hangouts," "bars," "5280 featured," etc.). This may complicate interpretation of the semantic meaning of the website. This information may have been tagged as metadata in the website, and the identification of the metadata tag may cause the system to remove the information. In contrast, content associated with the webpage (such as, for example, "order Anthony's pizza now") may not be deleted because the content is not associated with metadata, but is rather displayed to the user. Metadata may be removed by comparing metadata of the website against a list of metadata that is not useful for the parsing step.

Parsing may occur using a semantic web parser. For example, a website may be provided. A semantic website parser, such as SeemWebParser may identify words, phrases, or objects (such as clickable links) that indicate the semantic meaning of a website (or entire HTML contents), including the domain in which the website or application may be categorized. Additionally or alternatively, parsing may be a simple similarity model that identifies similarities between two strings of text. For example, a database may house information that tags the text "Order Now" with a semantic intent. The parser may crawl a website and identify any similar text items in the website. Following the above example, the website may include the text "Order Now." The website text may then be associated with the semantic intent stored in the database. Additionally, or alternatively, a machine learned model (e.g., Support Vector Machine, Conditional Random Fields, Discriminative Random Fields, Recurrent neural network) may be used to parse the website.

Method 200 continues to match page structure to domain definition operation 206. In operation 206, the identified domain of the website or content is matched to one or more existing CU systems. For example, database 108 may store one or more CU systems, and each CU system may have one or more associated domains. In particular, a website may be related to ordering pizzas. A database may store a CU system that relates to restaurants. As such, in this example, the parsing step 204 may identify that the pizza website relates to the restaurant domain. Accordingly, the CU system that includes the restaurant domain will be matched and tagged. The CU system may then be provided to the User Interface Authoring Platform 106 for confirmation.

Method 200 continues to match action data operation 208. In operation 208 information from the parsed content is used to match one or more tasks of the matched CU system matched in operation 206. Continuing with the pizza delivery website example, the action "order pizza," "accept payment," "create customer profile" may be identified as tasks that may be performed using a pre-existing CU system related to restaurants. The parsed content may reveal that a website is designed to accept orders for pizza as well as payment, but is not able to create a user profile. Thus, the task "order pizza" and "accept payment" may be provided to the User Interface Authoring Platform 106 for confirmation.

In aspects the technology mass action data operation 208 identifies information of a website that corresponds to one or more tasks of a matched CU system. Continuing with the example above, a website may display text that reads "order now" followed by fields into which a user may enter data. In aspects of the technology, the text associated with the fields (such as pizza size, pizza type, sauce type, etc.) may be identified as parameters associated with a task of an existing CU system. That is, in an example, the webpage may be parsed to discover that a user may order pizza (the action that will be maps to a task of an existing CU system) and additionally may identify parameters (pizza size, topping, types, sauce type, etc.) that may correspond to the parameters of the mapped task (i.e., the identified parameters become slots of the task).

Method 200 continues to examine and improve dialog system 210. In operation 210, the dialog system may be improved. For example, the parsed content may include entities such as "Tony's Pizza," "large pizza," "Hawaiian pizza," etc. The dialog system associated with the matched CU system may include dialog that has place holders for entities, such as "Do you want me to order {food_type} from {restaurant}." Following this example, the dialog system may be updated to include the dialog "Do you want me to order pizza from Tony's Pizza." This may occur by replacing the identified entities of the parsed content with the place holder entities of the dialog system 210. The suggested replacements may be provided to the User Interface Authoring Platform 106 of FIG. 1 for confirmation.

System 300 illustrates an aspect of an information flow, which information flow may be used to augment existing CU systems using parsed content (such as a website). In aspects, website 304 may have been identified by an author using a User Interface Authoring Platform 106. For example, a website developer interested in adapting a CU system to enable a user to vocally interact with an existing website may use User Interface Authoring Platform 106 to identify the website. The website will then be provided to the content scraper 304.

Additionally, one or more domains are provided to content scraper 304. Such domains may be provided by domain definition engine 308. The domain definition engine may store various domains. A domain may be an application or set of related computer executable applications that are used to execute a series of tasks in order to resolve a user query. That is, when a user interacts with a device using natural language, the user's intent is typically to have the computer perform one or more actions. These actions are grouped by domain. As an example, the query "Please change my 4:00 to 4:30" has a semantic meaning that includes moving, in a calendar application, an appointment that was previously scheduled at 4:00 PM to 4:30 PM. The domain application would categorize the request as included in a calendar domain application. The categorization may help contextualizing further requests. For example, if the next interaction was "cancel anything else that comes after my 4:30," the processing time and resources needed to resolve the semantic meaning of the statement is reduced if the computer interprets the request as being in the calendar domain. Accordingly, the domain engine stores a set of domains and associated tasks. The domain engine may receive, from a user, the intended domain of the website. For example, an author may use User Interface Authoring Platform 106 to identify an intended domain(s) of the website. As a specific example, the user may identify restaurant domain for a website that provides information regarding "Tony's Pizza" and additionally enables a user to order food from that website.

A knowledge store 310 may be a database or distributed network system in which entity information is stored. For example, each entity in the knowledge store may have associated knowledge graphs. For example, an entity maybe stored as a node, and the entity may be connected to other entities by edges. The edges may define a relationship between the entities. As an example, an entity may be a city, such as Bellevue. The entity may Bellevue be connected to the entity Washington state by a relationship that indicates that Bellevue is a city in Washington state. While this is one example, entities, relationships with other entities, and entity data (such as, in this example, population of Bellevue) may be stored in knowledge store 310 and sent to website scraper. The knowledge store 310 may be seeded with information obtained from a website search crawler.

The identified content information (e.g. website URL) is provided to the content scraper 312 along with the domain information from the domain engine 308. The content scraper 312 interprets the semantic meaning of the content (the content as illustrated is a website). In aspects, the interpretation is aided by the domain information received from domain engine 308. Semantic meaning of the content may be determined using natural language parsers as described above.

Additionally, the functionality of the website is analyzed by the content scraper 312. For example, objects in the website, such as clickable tags, text entry fields, video capture tags, etc., that indicate the website is capable of taking an action at the direction of the user is recorded by the content scraper 312. These action objects may be identified and stored. Furthermore, information may be entered into fields of the website by a system. Such information allows the system to identify the actions the website takes when information is entered into the website. For example, if the website is a pizza ordering website, the system may come to a page where a webpage is capable of receiving information relating to in order. The information may include the size of the pizza (e.g., as displayed in a drop-down menu) and pizza toppings (e.g., as displayed in a drop-down menu). The system may randomly choose one of the selectable items in each drop-down menu to mimic the actions a user may take. As an example, this may prompt the website to enable a "next" button. The system may then interact with the next button. Continue with this example, interaction with the "next" button may cause the website to navigate to a payment page. In this way, the system may identify the actions of a website (in this case, customizing a pizza and paying for the pizza).

The parsed content (and the interpreted semantic meaning) along with the tagged actions are sent to the action definitions store 314, where one or more tasks are identified based on the parsed content. In action definition store 314, one or more tasks are identified using the information determined from the content scraper 312. For example, the website may have a clickable object with the label "order now," that brings a user to a page where a user may enter a variety of information related to the food the user wishes to purchase. This information may be passed to the action definition to identify a corresponding task of an existing CU system that is associated with the action.

Information from domain definition store 308, knowledge base 310, and action definition store 314 is provided to full dialog and task definition store 316. The information is used to augment and update a dialog knowledge base. For example, the entities identified in the website, along with the domain, may be used to identify a suitable dialog system. Continuing with the example related to a website that facilitates the ordering of pizza, a dialog system may be updated, which dialog system is related to the restaurant domain. The information may then be passed to a digital assistant 318. The digital assistant 318 may use the information that it receives to enable a user to interact vocally to use the website.

Figure 4:
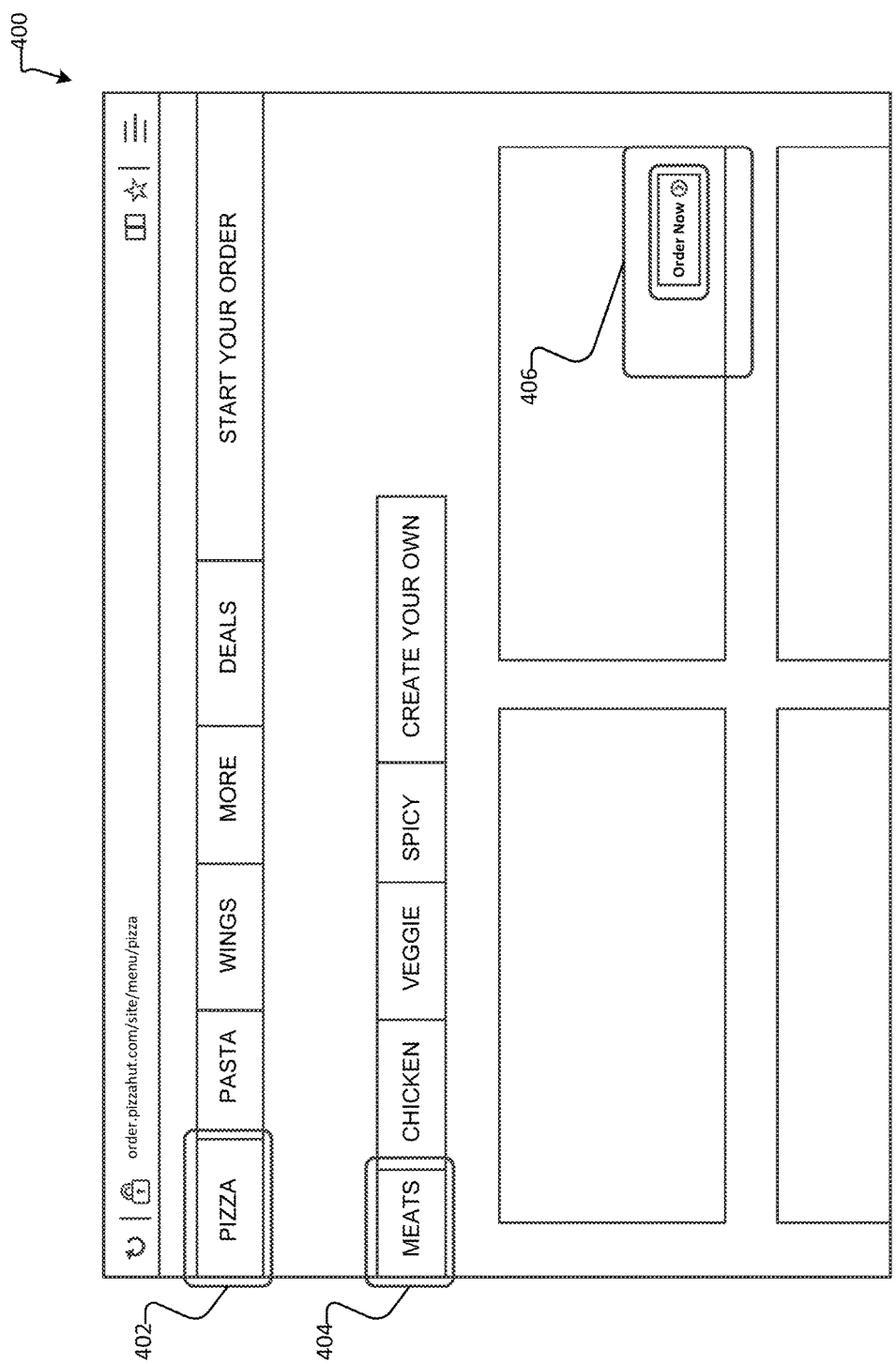
FIG. 4 illustrates an example of content that may be parsed to augment a CU system.

FIG. 4 illustrates an example of content 400 that may be parsed to augment a CU system. As illustrated, FIG. 4 is a website. The website shown includes three entities, though it will be appreciated that more or less entities may be parsed for a given content. The identified entities include the entity pizza 402, the entity meats 404, and the entity "order now" 406.

In aspects of the technology, the content 400 is parsed to determine one or more CU systems and associated LU/Dialog systems that may be relevant to the content. Following the illustrated example, a CU system related to restaurants may have been identified. Identification may occur by the system parsing content 400 to recognize that the text "pizza" is related to the food entity and the text "meats" is also a food entity. The computer may determine this using a natural language understanding model. Indeed, an author may have provided the domain to a system to aid in determining that the entity is a food entity. Similarly, the entity "order now" may be identified as an entity. Each of these entities, along with knowledge that the domain is the restaurant domain, may aid in determining that an action related to the website may include "order now." This action may be identified in a CU system, which may use the identified entities "Pizza" and "meats" to populate parameter options for the order now task.

Figure 5:
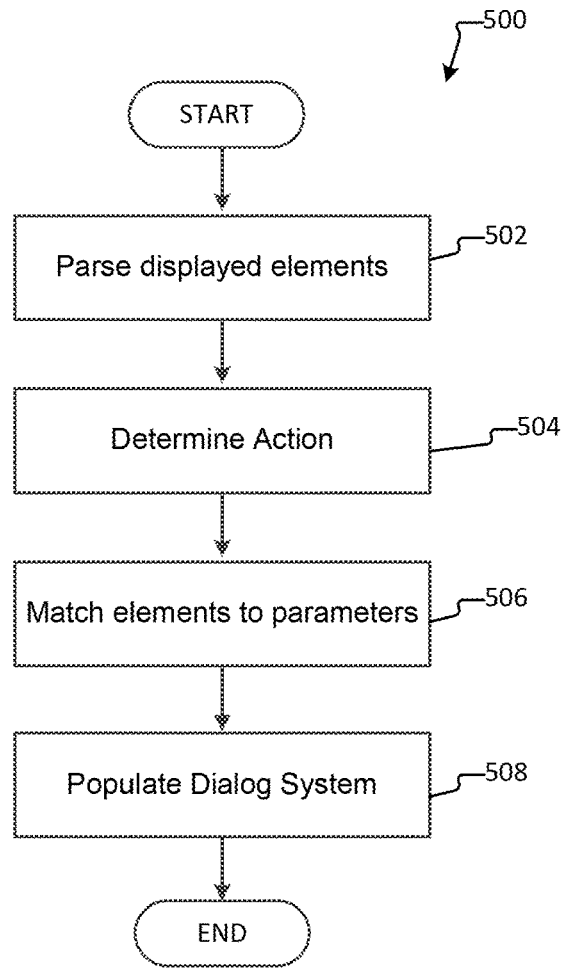
FIG. 5 is a method for parsing content to determine tasks, entities, and parameters.

FIG. 5 is a method 500 is a method 500 for parsing content to determine tasks, entities, and parameters. Method 500 begins with parse displayed elements operation 502. In operation 502, content, such as a website may be parsed to determine the semantic meaning. Parsing may be performed using a parser such as the SemWebParser; however, one of skill in the art will appreciate that other parsers may be employed without departing from the scope of this disclosure.

Method 500 then continues to determine action operation 504. In operation 504 one or more potential actions related to the parsed content are identified using the parsed information. For example, where content is a website an action such as "order now," or "create customer profile," may be identified. Identification may occur by both semantic meaning of text (e.g., text that says "order now") as well as identifying objects in the website that allow a user to perform an action (a clickable area that brings one to an ordering screen). To continue with the above example, the text "order now" being displayed on a clickable area that brings a user to a web page were one can enter text fields would indicate a high probability that the content (in this case a website) has the capability of receiving actions from a user.

Method 500 then continues to match elements to parameters description operation 506. In operation 506, the elements of a content source (such as a website) are identified to determine whether the element matches any parameters (necessary or optional) for the task identified in operation 504. That is, the inputs associated with the action are parsed and identified. For example, a website operation may have an "order now" clickable item that brings a user to another webpage that includes multiple fields where a user can enter text. These fields may include parameters such as "address," "name." In addition the page may include a drop down field with items such as "pizza size," "toppings," etc. These fields, drop down list, etc., are added as potential solutions to parameters of a task. For example, where an existing CU model includes a task that has parameters (food_type, food_type_options) and the content includes allowing a user to order pizza or a calzone, and each of those may have peperoni, sausage, and/or mushroom, the CU model may identify food_type as potentially being a calzone or a pizza, and the options as being peperoni, sausage, and/or mushroom.

The method then proceeds to augment dialog operation 510. At 510, the dialog system is augmented with the identified entities and parameters. Continuing with the example above, an existing CU system may include dialog that says "Would you like to order food_type(1) -food-_type (n)" and "How would you like your {food_type}? With {food_type_options(1-m)}?" (where n is the number of food types and m is the number of food_type_options). The dialog system may replace the place holder entities with the parsed content to augment the dialog. Following the example above, the dialog system may be changed to "Would you like to order Pizza or a Calzone" and "How would you like your Pizza, with Peperoni, Sausage, and or Mushrooms?" After operation 510, the method ends.

Figure 6:
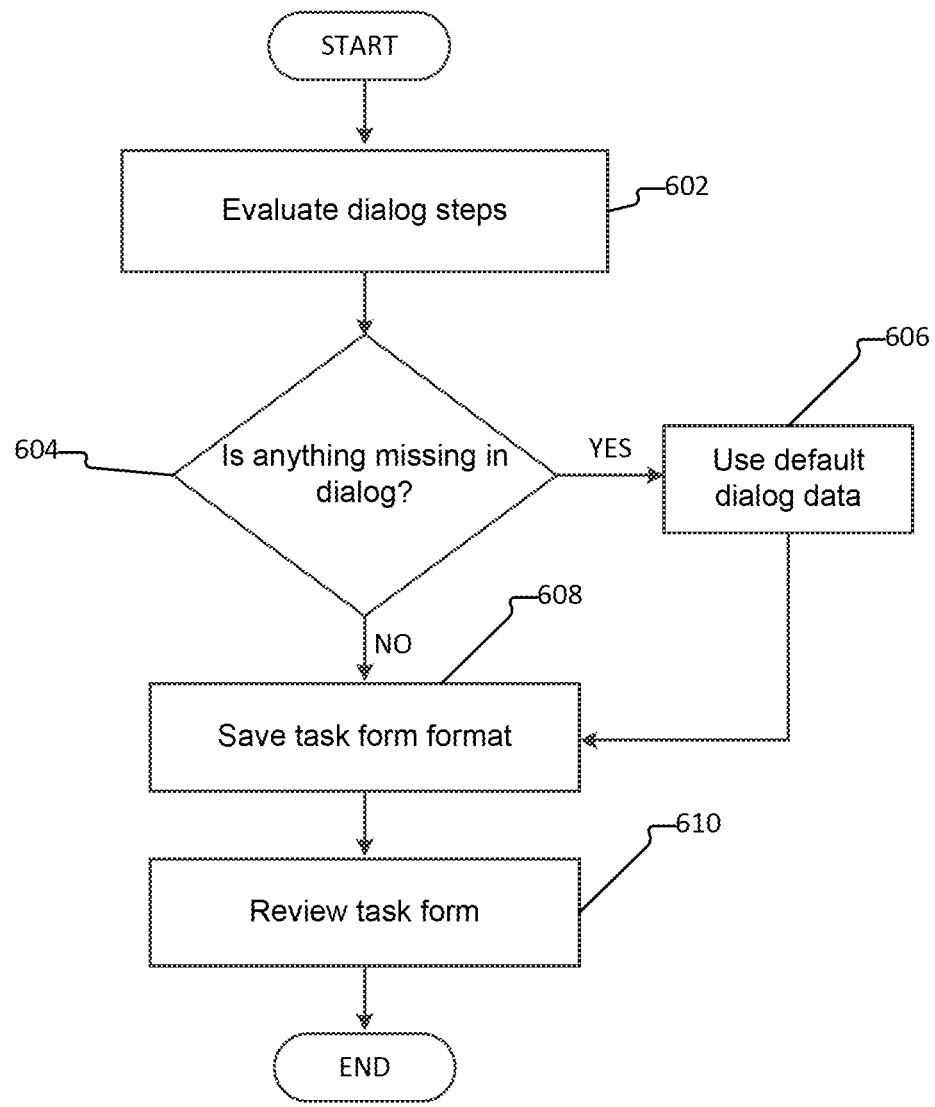
FIG. 6 is a method for updating a dialog system.

FIG. 6 is a method 600 for updating a dialog system. Method 600 begins with evaluate existing dialog operation 602. In aspects, an existing dialog system is evaluated to determine relevant dialog prompts associated with suggested tasks. For example, a CU system may have multiple tasks. The set of the tasks may have been identified as potentially useful for a particular content, such as a website. The task may have an associated dialog system. The dialog system may be analyzed to determine what needs to be added. For example, where place holder entities are used in a dialog system, the place holder entities may be replaced with identified entities of the content.

After the dialog system is updated with entities obtained from parsing content, the method 600 proceeds to determine operation 604. In determine operation 604, it is determined whether the identified CU system has any dialog deficiencies. For example, a dialog system may not have a placeholder entity particularized for an augmented task.

If deficiencies are detected at determine operation 604, then flwo branches YES and the method 600 proceeds to use default operation 606. Default dialog may replace placeholder entities. For example, a dialog system may include "What would you like to order from {entity_restaurant_name}" where entity_restaurant_name is a place holder entity for a restaurant. In aspects, the parsed content may have not identified the restaurant name. A default dialog data "this restaurant" may then be used to augment the system. Thus, the resulting dialog would be "what would you like to order from this restaurant."

If there are no deficiencies detected (or if defaults are used), then method 600 branches NO and proceeds from determine operation 604 to save task format operation 608. In save task format, a task format from a pre-existing CU system is saved and tagged as a potential task associated with the content item.

Method 600 then proceeds to review task form operation 610. In review task form operation 610, the task form is reviewed. In aspects of the technology, the task form may be reviewed using the authoring platform 106. After operation 610, the method ends.

Figure 7:
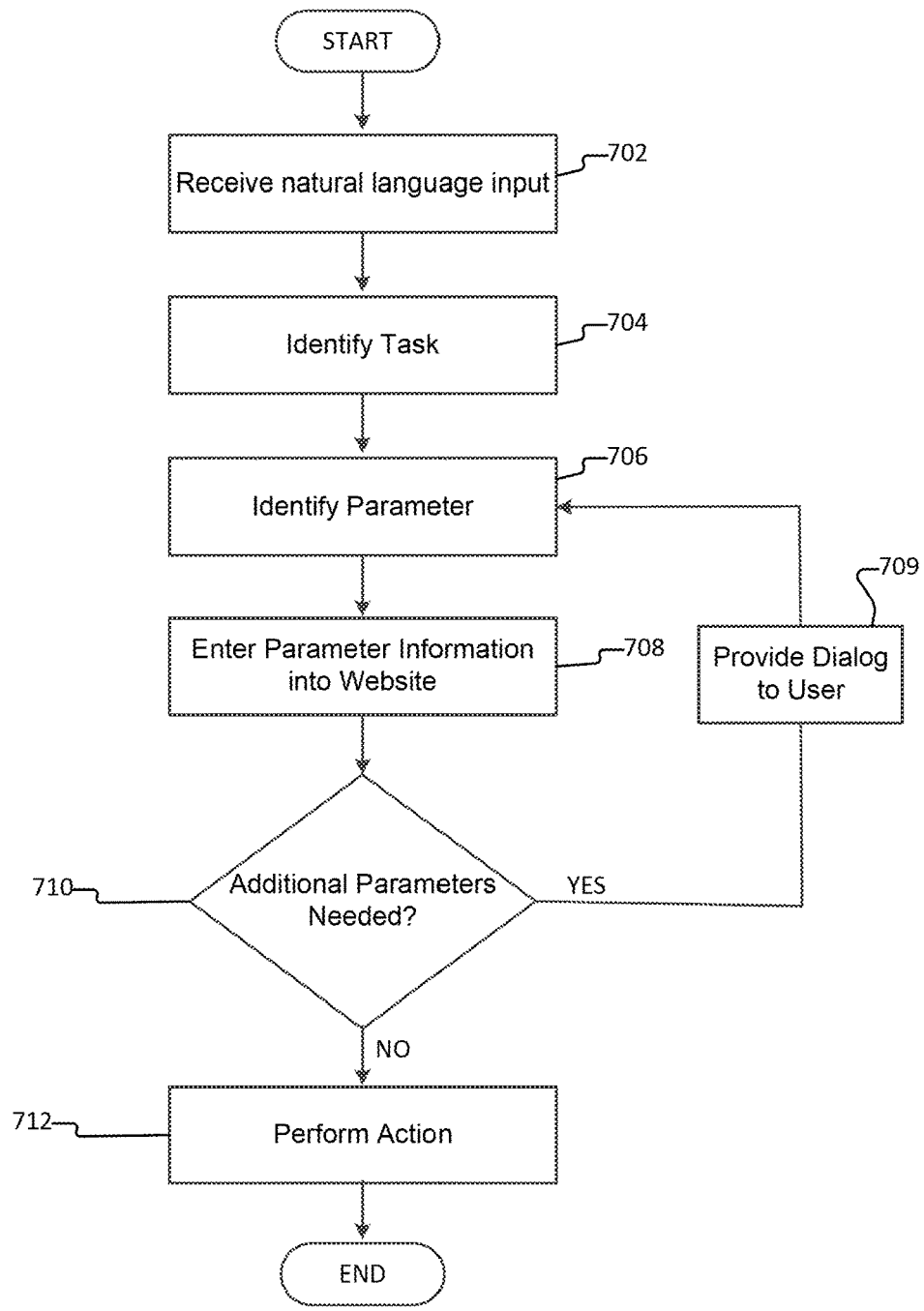
FIG. 7 is a method for interacting with a user using an augmented CU system.

FIG. 7 is a method 700 for interacting with a user using an augmented CU system. Method 700 begins with receive natural language input operation 702. In aspects of the technology, the natural language input may be vocal input. For example, vocal input may include "I would like to order a pizza from Tony's Pizza." Interpretation of the vocal input may include identifying a website associated with the request. For example, a natural language understanding model may have been trained to search the internet for a website associated with "Tony's Pizza" when receiving such a request.

Method 700 proceeds to identify associated CU system operation 703. In operation 700, it is determined whether the searched website has an associated CU system. For example, the website may be one that has been associated with an augmented CU system using the systems and method described herein.

Method 700 then proceeds to identify tasks operation 704. In operation 704, the natural language input is interpreted to identify a task. For example, the natural language input may be interpreted using a natural language understanding model. Following the above example, it may be determined, using the augmented CU system, the user is attempting to order food from a website.

The method the proceeds to identify parameter operation 706. In identify parameter operation 706, one or more parameters may be identified from the vocal input. For example, if the natural language input is "Order Food From Tony's Pizza" there may be no parameters identified. If the natural language input was "Order Pizza from Tony's Pizza" the food_type parameter is identified as Pizza.

Method 700 then proceeds to enter parameter information into website operation 708. In operation 708, the identified parameters are entered into the website. If additional parameters are needed, then the method proceeds to provide dialog to user. For example, if food_type is required, then the dialog system may ask the user "Okay, what would you like to order from Tony's Pizza." If pizza was understood as a parameter, the method may then the dialog system may return "Okay, what toppings do you want on your pizza."

Method 700 then proceeds to determination 710. At determination 710, it is determined whether or not a task requires additional parameters to complete the task. For example if the task related to ordering food, and the user has failed to enter payment information, the parameters relating to payment information (e.g. credit card, name, expiration date, etc.) would be identified as additional parameters.

If at determination 710, it is determined that additional parameters are needed, proceeds to provide dialog to a user method 700 proceeds to provide dialog to user operation 709. At operation 709, dialogue is provided to the user to elicit the additional parameters needed. To continue with the example above, the dialog provided to the user may be "how would you like to pay for that," "what is your credit card number," and the like. The user then provides input into the system, and that input will be analyzed at operation 706 to identify the parameter.

This loop continues until there are no more required parameters to execute the task. When no further parameters are needed, the method then proceeds to perform action operation 712, where the action is performed.

Figure 8:
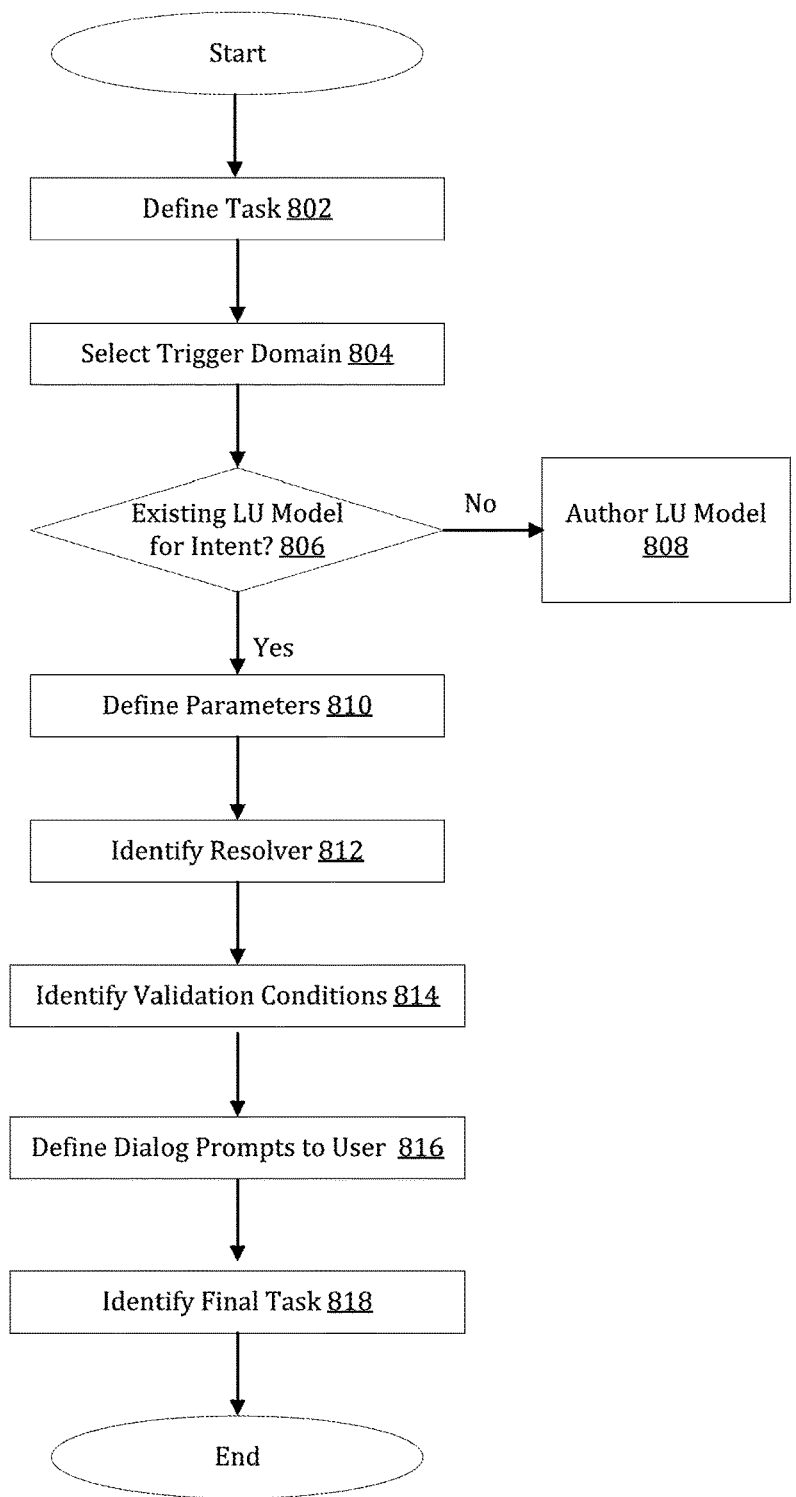
FIG. 8 illustrates an example method for confirming an identified task.

FIG. 8 illustrates an example method 800 for confirming an identified task using the user interface authoring platform, such as the user interface authoring platform 106 of FIG. 1. As described herein, a user interface authoring platform allows a third-party application designer to, among other features, confirm/specify tasks and corresponding parameters identified in content such as a website. Additionally, the third-party application designer may select appropriate LU models used to analyze and extract speech to determine a user's intent as it relates to the defined task identified in content such as a website. Confirmation of a task includes confirming whether the value of each parameter is to be provided by the user or inferred by the CU system, confirming how to request information from the user if additional input is required, confirming whether tagged input is sufficient to include information to satisfy the one or more defined parameters, and combining the tagged user input as user input with other parameters that have been collected in order to canonicalize and resolve the entity representing that particular parameter.

For example, where a website relates to ordering a taxi, a resolver may combine a previously-collected parameter representing the user's location together with tagged user input representing the type of taxi desired by the user to determine whether the type of taxi requested by the user is available. If such a taxi type is available, the resolver may provide a product identification. If, alternatively, no such taxi type is available, the resolver may provide an error message indicating that the particular type of cab requested is not available in that location. In another example, such as a phone calling experience, the system may use a previously-collected parameter indicating which contact to call, together with tagged user input representing the phone number type (for example, work, home, or cellular) in order to identify the actual phone number to dial.

It is understood that the user interface authoring platform 106 may be used to guide an author to confirm tasks, confirm LU models, intents, parameters, resolvers, validation conditions, etc., which options where based on parsed content, such as a website. The user interface authoring platform 106 may guide the author throughout the authoring process by providing the author with suggestions based on parsed content. For example, the user interface authoring platform 106 may provide suggestions for possible intents, slot tags, parameters, resolvers, validation conditions, etc. based on the parsed content.

Furthermore, although illustrations and examples provided herein describe a particular implementation using the platform 106, novel aspects of the present disclosure may also be implemented using an Integrated Development Environment (IDE) such as, for example, Visual Studio offered by Microsoft of Redmond, Washington. Such an implementation using an IDE allows authors to confirm task specifications using a text-like developer tool that is not web-portal based. Such an IDE may also provide support for discovery, auto-completion, other suggestions, and syntax correction of task definition files. An example IDE is shown and described with reference to FIG. 9.

In the task confirmation operation 802, the user interface authoring platform 106 prompts the third-party application author (hereinafter "author") to confirm a task. In particular, confirming a task may involve confirming the task name and/or an associated description. In an example, the user interface authoring platform 106 may present a dialog box prompting the author to confirm the name of a task that the particular application executes. For example, a task may be identified, based on parsed content such as a website, as "BookTaxi" for a taxi service application. In other examples, the task may be identified as "FindScores" for a sports application. The task definition operation 802 may also prompt the author to augment/add a description of the task to be executed by the CU system. In the example above, the "BookTaxi" task name may be associated with a description such as, for example, "Task to enable booking a taxi using Cortana." In the task confirmation operation 802, the user interface authoring platform 106 also prompts the author to confirm at least one LU domain or category associated with the task, which LU may have been selected based on parsed content. Language understanding models may be organized by their relevant domain. Accordingly, a suggestion of a LU domain may be presented to an author based on domains identified in the parsed content.

For example, where a website is related to booking taxies, an identified domain may be "taxi" or "transportation." Accordingly, the identification of the domain may provide a suggestion for the choice of LU models from which the author may select (or confirm). These suggested domains may be provided from one or more available domains and as saved in the database 108. It is understood that identified tasks of the content may have one or more LU models associated therewith. Accordingly, more than one LU model may be suggested to and/or confirmed by the author. Each LU model may be independent from one another. For example, in the BookTaxi task example, one suggested LU model may be a transportation LU model and another suggested LU model may be a time and date LU model In the confirm trigger domain operation 804, the author may confirm one or more additional trigger domains associated with the identified task, which task may have been identified from the parsed content. Generally, a trigger domain is considered to be a collection of trigger intents that include the slot tags for tagging the information necessary to execute the task. In an example, an "alarm" trigger domain may comprise trigger intents of various actions that could be taken such as, for example, "add_alarm," "modify_alarm," "query_alarm," and "delete_alarm" wherein the corresponding slot tags to fulfill those trigger intents might be, for example, "alarm_name," "alarm_time," etc. Accordingly, it is understood that in operation 802, the LU domain suggested has associated therewith one or more trigger intents and corresponding slot tags. If the suggested domain in operation 802 does not include all the intents necessary to execute the task, an author, in operation 804, may select one or more additional trigger domains that include one or more additional trigger intents for task execution. Accordingly, the user interface authoring platform 106 may suggest, based on the parsed content, another trigger domain that is used to trigger execution of the task. Based on the suggested trigger domain and the associated LU model, the user interface authoring platform 106 may prompt the author to select one of the populated trigger intents associated with the selected trigger domain. In the taxi reservation example, an additional domain such as "restaurant" may be selected, and the user interface authoring platform 106 may populate one or more intent associated with the selected restaurant domain, including, among other intents, an "add_tip" intent and a corresponding slot tag such as "tip_amount." Accordingly, the parsed content may provide suggestions regarding one or more pre-existing domains to author a task. Additionally or alternatively, the author may, using the user interface authoring platform 106, create a new intent and build an LU model specific to the newly created intent. The author may therefore create a new domain entirely or augment the suggested domain.

Each suggested intent may be associated with one or more LU models that include commonly used phrases or words associated with executing the task. Continuing with the taxi example, the LU model may be suggested based on the intent (determined, for example, by parsing content such as a website) or the author may select corresponding LU models. In an example, for a "book_taxi" intent, the author may use the LU model suggested, which may include a Book Taxi LU model. The Book Taxi LU model may be particularly directed to identifying speech (including words and phrases) associated with the intent of booking a taxi (such intent being determined by parsing content, for example). Alternatively, if the desired LU model is unavailable, the author may create a new LU model corresponding to the particular task. It is understood that more than one intents and more than one models may be suggested to trigger the task.

Alternatively or additionally, the author may, using the user interface authoring platform 106, whitelist, or hard code certain queries or phrases that trigger the defined task. Thus, if the CU system receives an exact spoken query, the task will be triggered and selected LU models may be used to assist the CU system in executing the task.

In the LU model coverage decision 806, the user interface authoring platform 106 may ask the author whether the suggested LU model(s) stored in database 108 are sufficient to trigger execution of the task. If the stored LU models are insufficient to trigger execution of the task flow proceeds to operation 808 in which the author may add one or more LU models not previously stored in the database 108. In some examples, the author may create such LU models to trigger execution of the defined task. In some examples, the author may also save the created model in the database 108.

Alternatively, if at the LU model coverage decision 806 it is determined that the suggested LU models are sufficient to trigger execution of the defined task, flow proceeds to the define parameters operation 810. In the confirm parameters operation 810, parameters are confirmed. As described herein, tasks may be described by one or more parameters that are fulfilled prior to task execution. Parameters specify the task and the pieces of information that need to be collected by the CU system before the task is executed. Parameters relate to, and provide information for, the task defined in operation 802. A parameter may correspond to information that must be collected or processed by the CU system before the task can be executed. For example, a parameter may correspond to information such as the start location of the "BookTaxi" task. Parameters may be grouped into required parameters or optional parameters, wherein the required parameters are pieces of information that must be collected for the task to be executed, and optional parameters are those that further refine the task, but are not necessary for task execution or whose default or inferred values are sufficient to execute the task. In addition, whether a parameter is optional or required may be expressed in terms of an expression over the state or value of other parameter values that are evaluated at runtime. The value of each parameter is either collected by the CU system or it is inferred by the system. For example, if a parameter requires the person's location, the person may either provide that information or the CU system may use the device's GPS system to determine the person's location. Alternatively or additionally, if time is a parameter, the person may provide the time to the CU system or the system may infer that if no time is specified, the current time or some other time is used.

In the confirm parameters operation 810, for each parameter identified by parsing content such as a website, the user interface authoring platform 106 may confirm the name of the parameter, the parameter type, and the one or more slot tags associated with the particular parameter (e.g., for the "BookTaxi" task, slot tags may be, for example, "origin_location" and "end_location"),In one example implementation, an author may confirm the name of the parameter, a description of the parameter, a parameter type, one or more parameter slot tags, an appropriate resolver for the parameter, a selection indicating whether the parameter is a unique value, and a selection indicating whether the parameter requires user confirmation. Additionally, one or more dialog acts may be used to define how the system obtains information for each parameter. In some aspects, a dialog act may be defined as a prompt that is displayed or otherwise provided to a user and in other aspects, a dialog act is defined differently. In the define parameters operation, information gathering dialog acts may be, for example, a missing value dialog act, a disambiguation dialog act, a no results dialog act, a suggestions dialog act, a selection dialog act for prompting the user to select from among a small list of possible values, and a confirmation dialog act prompting the user to confirm the value of the parameter. The one or more dialog acts may be used to define the user interface implementation for obtaining such information related to each parameter from the user. In particular, the author may define one or more user interfaces that may be provided to a user to simply display information to the user or to obtain information for task execution. In the "BookTaxi" task example, a dialog act may be used to define a map user interface that could be displayed on the user's device showing the pick-up location in response to receiving information relating to the "destination_location" parameter. Still further, in the "BookTaxi" task example, another dialog act may be used to define an interactive map or a selectable list of nearby or potential locations on the user's device in response to receiving a pick-up location that could not be found or determined by the system.

Referring back to the confirm parameters operation 810, the parameter description may be a text string that provides further detail about the parameter. For example, in the taxi example, for the parameter name "end_location" the associated description may be "The destination location of the trip." This description may be confirmed by the author.

The parameter type may categorize the parameter. For example, the parameter type for the "end_location" parameter may be of type "Place." The type may be a predefined type that is understood by the CU system. Accordingly, by setting the type as "Place" the CU system may understand that the end_location parameter corresponds to latitude/longitudinal coordinates. It is understood that the parameter type may be either defined or selected from a list of parameter types by the author.

The one or more slot tags are used as inputs to resolve the parameter. In this example, the slot tags "absolute_location", "place_type", and "place_name" may be suggested based on parsed content and confirmed by the author, each of which correspond to a particular type of location information tagged in user input utterances. For example, "One Microsoft Way" may be tagged as an "absolute_location," whereas "the Space Needle" may be tagged as a "place_name." Collectively, the set of slot values corresponding to the instances of "absolute_location", "place_type" and "place_name" will be used to resolve the user input into one or more place entities, which would form the possible values of the parameter end_location.

The suggested resolver for each parameter may be used to inform the CU system how to resolve or understand a detected keyword. In this example, a "PlaceResolver" may be suggested (based on parsed content), which informs the system that the provided parameter is associated with latitude and longitudinal coordinates. In the "BookTaxi" task example, for a car preference parameter, the CU system extracts, from the natural language query, the user's car preference. Based on the provided resolver, the CU system determines or resolves the car preference into a car identification. In some examples, it is understood that authorship of the resolver may by be semi-automated using the parsed content.

Additionally, a missing value dialog act may be suggested based on the parsed content. The missing value dialog act may instruct the CU system to request, from the user, the parameter value if the value is not obtained from the query. For example, the missing value dialog act may be a prompt string such as, "Where would you like to go?" for the "end_location" parameter. The dialog act may also be used to specify the associated user experience, such as displaying, on the display of the device, the prompt string, or verbally providing the prompt to the user. In the "end_location" parameter example, it may be suggested, based on the parsed content, to use a map user interface to display a selectable map that allows the user to simply select the destination location rather than providing it verbally or typing it in. In another example such as a "BookRestaurant" task having a "reservation_time" parameter, it may be suggested, based on the parsed content, to provide a user interface to display a selectable list of appropriate times from which the user may choose as the reservation time.

A disambiguation dialog act, which may be suggested based on the parsed content, that instructs the CU system to ask the user to verify a particular value of a parameter in order to resolve ambiguities that may arise because the CU system obtained multiple potential values for a parameter For example, in response to extracting two different locations from the natural language query, the CU system may display a listing of the obtained values alongside a prompt such as "Please select your destination location." In other examples, the CU system may simply prompt the user to re-state the destination location without providing a selection. A user interface dialog act that is displayed or otherwise provided to the user in response to receiving conflicting pieces of information may be suggested based on the parsed content. In an example, a dialog act that displays, on the user's device, a listing of the conflicting pieces of information may be suggested based on the parsed content. In addition a dialog box that displays a request to the user to select the correct information, or, if none of the displayed information is appropriate, requesting the user to manually or verbally provide the information may be suggested based on the parsed content.

The suggested no results dialog act may instructs the CU system to indicate that no results were returned. For example, using the user interface authoring platform 106, the suggested dialog act may also/alternatively indicate that no results were returned.

The suggested suggestions dialog act may instruct the CU system to provide the user with one or more suggestions in response to returning no results. For example, the suggested box may define a prompt such as "Please select a location" and an associated user interface including a list of the suggested locations or a map displaying the suggested locations.

In the identify resolvers operation 812, for each parameter, the user interface authoring platform 106 specifically identifies the resolver selected in the identify parameters operation 810. For example, the identify resolvers operation 812 may comprise identifying the name and relative path of the library in which the selected resolver resides as well as identification of the function name within the resolver library.

A suggested dialog box may define a failure dialog act that provides a failure prompt to the user in the event that the parameter cannot be resolved. In an example, for a location-based parameter, the suggested dialog box may define a dialog act that provides a text string that recites, "I'm sorry, I cannot resolve the location right now."

In the identify validation conditions operation 814, the user interface authoring platform 106 may provide suggestions based on parsed content to define conditions that must be satisfied prior to task completion and what the system should do if one or more of those conditions are breached. In an example, when booking a taxi, a validation condition would ensure that the start and end location may be reachable using only ground transportation. In another example, for an email sending task, a validation condition would ensure that the subject and body of the email are not both empty before sending the email.

In the final task suggestion operation 816, a final action or task may be defined. In an example, the final task suggestion operation 816 may suggest a name, based on parsed content, for the final action as well as a listing of each of the required and optional input parameters that need to be provided for task execution. The final task suggestion operation 816 may further prompt the user to provide the resolver associated with the final action. The final action resolver is responsible for providing the final piece of information to be displayed to the user, or performing an action on behalf of the user. For example, in the taxi example, the final action resolver is responsible for placing an order for a taxi based on the received information. The final action resolver may further include, in an example, also returning a confirmation code that can be displayed to the user. In the final task suggestion operation 216, the suggestion may define a confirmation dialog act that prompts the user to confirm the task execution prior to task execution. In the taxi example, a confirmation dialog act comprising a prompt such as "Would you like me to book this trip now?" may be suggested based on parsed content. Alternatively, in the final task identification operation 216, the suggestion may define a confirmation failure dialog act that prompts the user to confirm the non-execution of a task. A task may not be executed based on user interaction with the system or based on the lapsing of a predetermined period of time. In the taxi example, a confirmation failure dialog act such as, "I will not book this trip. What would you like to change?" may be defined by the suggestion and provided to the user. In the final task identification operation 216, the suggestion may define a completion dialog act that specifies a completion prompt to be displayed or otherwise provided to the user in the event that the task is executed. In the taxi example, a completion prompt such as, "Your taxi has been booked. Your booking ID is <ID>" may be provided to the user.

Accordingly, the method 800 provides a third-party-application author with the ability to confirm one or more suggested tasks that may be executed using the CU system of the device as well as the ability to author one or more dialog acts. In confirming the task, the method 900 allows the third-party-application author to leverage third party LU models in combination with parsed content to semi-automate the task of identifying the necessary and optional parameters associated with the task as well as leverage one or more third party resolvers used by the CU system to understand the detected keywords in order to complete the task.

Figure 9:
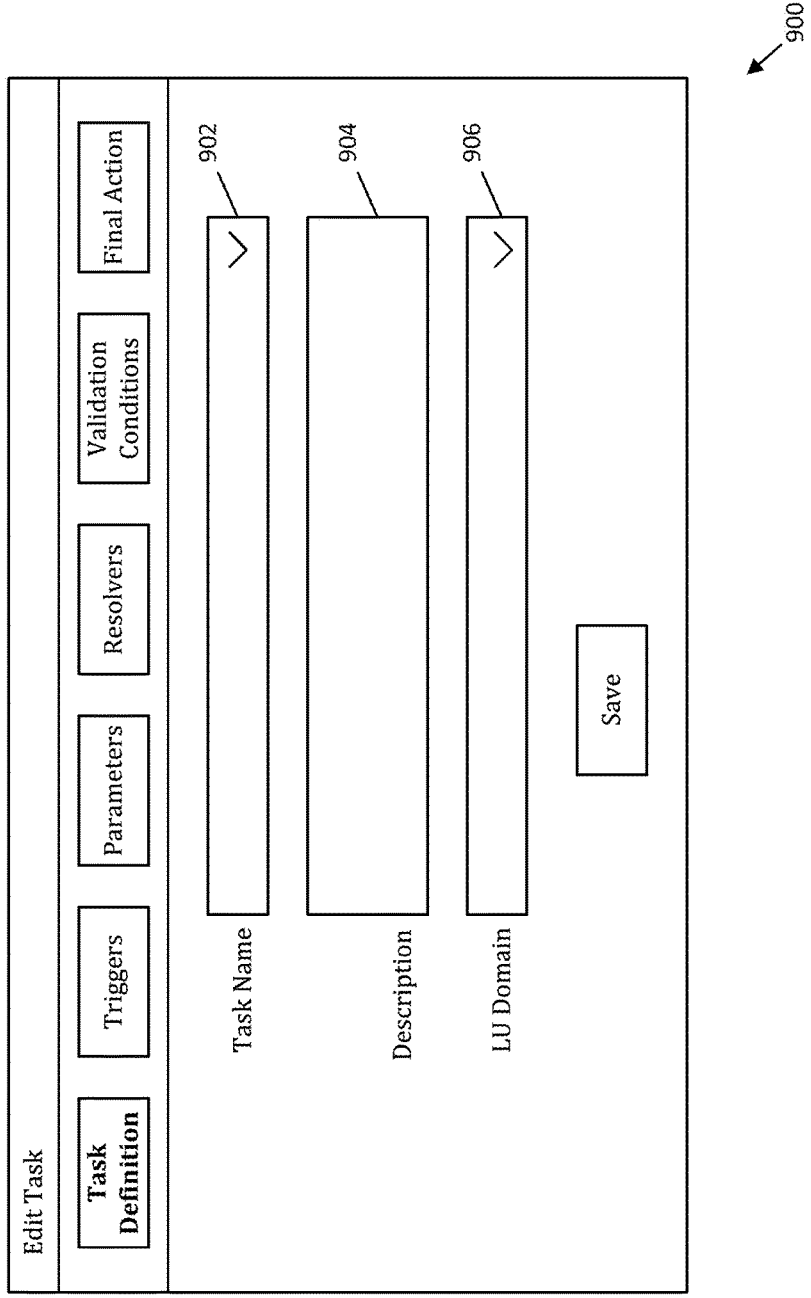
FIG. 9 illustrates an example screenshot of a user interface authoring platform for confirming a task.

FIG. 9 illustrates an example screenshot 900 of the user interface authoring platform for confirming a task as described with reference to the task definition operation 802 of FIG. 8. As illustrated in the example screenshot 900, the user interface authoring platform 106 includes a text box 902 for providing the task name and a text box 904 for providing a description of the task. The user interface authoring platform 106 further provides a drop-down menu 906 having a list of LU models from which the author may select. In other aspects, the LU models may be provided, rather than selected, by the user.

Figure 10:
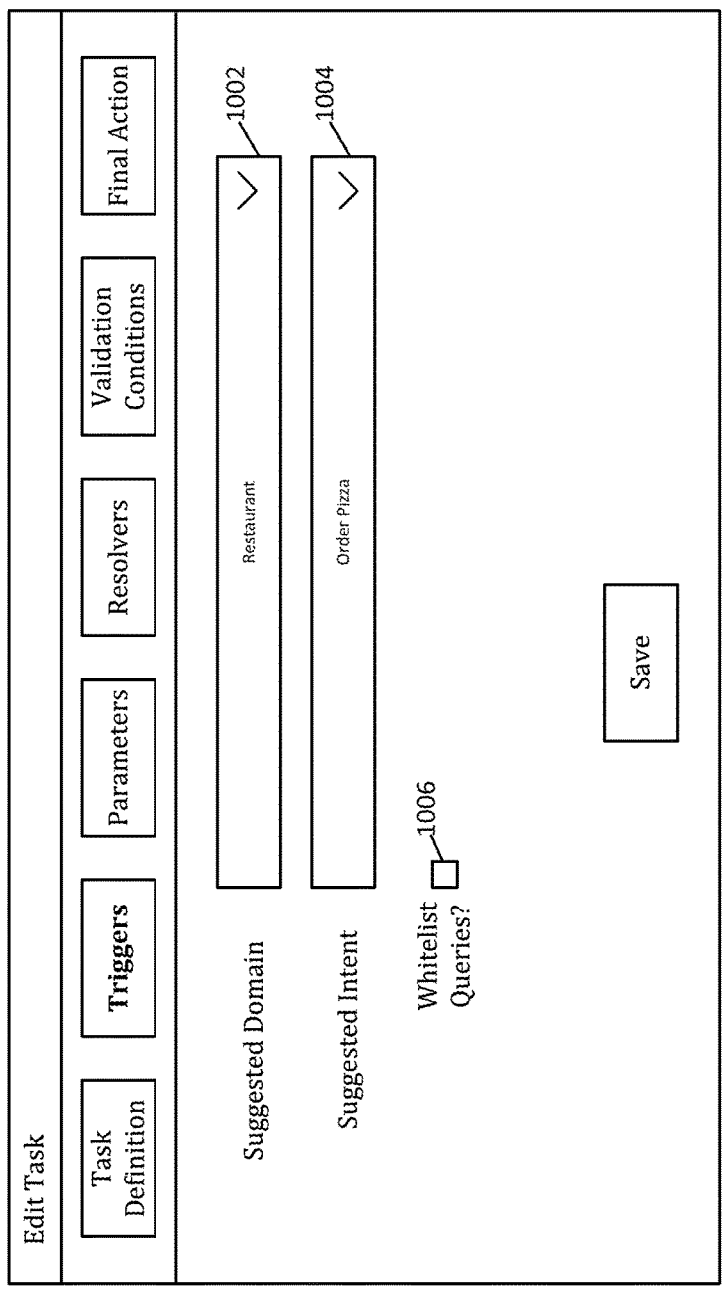
FIG. 10 illustrates an example user interface authoring platform for confirming one or more trigger domains.

FIG. 10 illustrates an example user interface authoring platform for confirming one or more trigger domains and identifying one or more related intents as described with reference to the select trigger domain operation 804 of FIG. 8. As illustrated in the example screenshot 1000, if the suggested domains and intents are desired to be changed, the user interface authoring platform 106 includes, in an example, a drop-down menu 1002 for selecting additional/alternative domains used to trigger the particular task. Based on the selected additional domain in menu 1002, one or more corresponding intents may be automatically populated in suggested intent drop-down menu 1004 from which an author may select. As described herein, the suggested intent will be the basis for the model that will be used to trigger execution of the task. The example screenshot 1000 further includes a selection box 1006 identifying whether the author would like to whitelist or hard code trigger queries. If selected, the selection box 1006 would reveal an additional input text box for the experience author to provide a list of trigger queries (not shown).

FIG. 11 illustrates an example screenshot of the user interface authoring platform 106 for conforming and editing suggested parameters as described with reference to the confirm parameters operation 810 of FIG. 8. As illustrated in the example screenshot 1100, the user interface authoring platform 106 may include menu 1102 that identifies the name of the parameter as well as menu 1104 for identifying a description of the parameter. It is understood that menus 1102 and 1104 may be pre-populated based on the intent identified based on the parsed content, which intent is associated with the parameter. The user interface authoring platform 106 may also include a menu 1106 for identifying a type to categorize the parameter. It is understood that menu 1106 may be a drop down menu from which an author may select the appropriate parameter type. Still further, the user interface authoring platform 106 may include menu 108 to provide or select one or more slot tags that map to the particular suggested parameter. The user interface authoring platform 106 may include menu for providing or selecting a resolver for the suggested parameter.

The user interface authoring platform 106 may also include menu 1112 for defining dialog act that instructs the CU system to request, from the user, a parameter value if it is not obtained from the query (e.g., a missing value dialog act). In some aspects, the menu 1112 is a drop-down menu including one or more suggested prompt strings from which an author may select. In other aspects, the author may provide the prompt string. And yet in other aspects, other dialog acts are provided, such as the corresponding user experience/interface. The selection may also be displayed to the author, allowing the author to view each selected prompt from menu 512.

Still further, the user interface authoring platform 106 may include menu 1114 for defining a dialog act that instructs the CU system to ask the user to verify a particular value of a parameter in order to resolve ambiguities that may arise because the CU system obtained multiple potential values for a parameter (e.g., a disambiguation dialog act). Similar to menu 1112, menu 1114 may be, in some aspects, a drop-down menu including one or more disambiguation suggested prompts from which an author may select or the author may provide the prompt and corresponding user experience/interface. The selection may also be displayed to the author.

The user interface authoring platform 106 may also include a selection box 1116 indicating whether the parameter is a unique value and a selection box 1118 indicating whether the parameter requires user confirmation.

It is understood that FIG. 11 is merely exemplary and that the various menus 1102-1114 may each be drop-down menus of possible dialog acts from which the author may select. There may also be an associated selection button such as an "Add" button allowing the author to add the suggested dialog act from one of the menus 1102-1114. In such an example, once a selected dialog act is added, that dialog act may be shown in the display, allowing the author to view each selected dialog act. There may also be additional functionality allowing the author to define one or more associated user interfaces, as described herein with reference to the define parameters operation 810. It is therefore understood that FIG. 11 is merely exemplary and is not intended to limit the present disclosure to the illustrated configuration.

Figure 12:
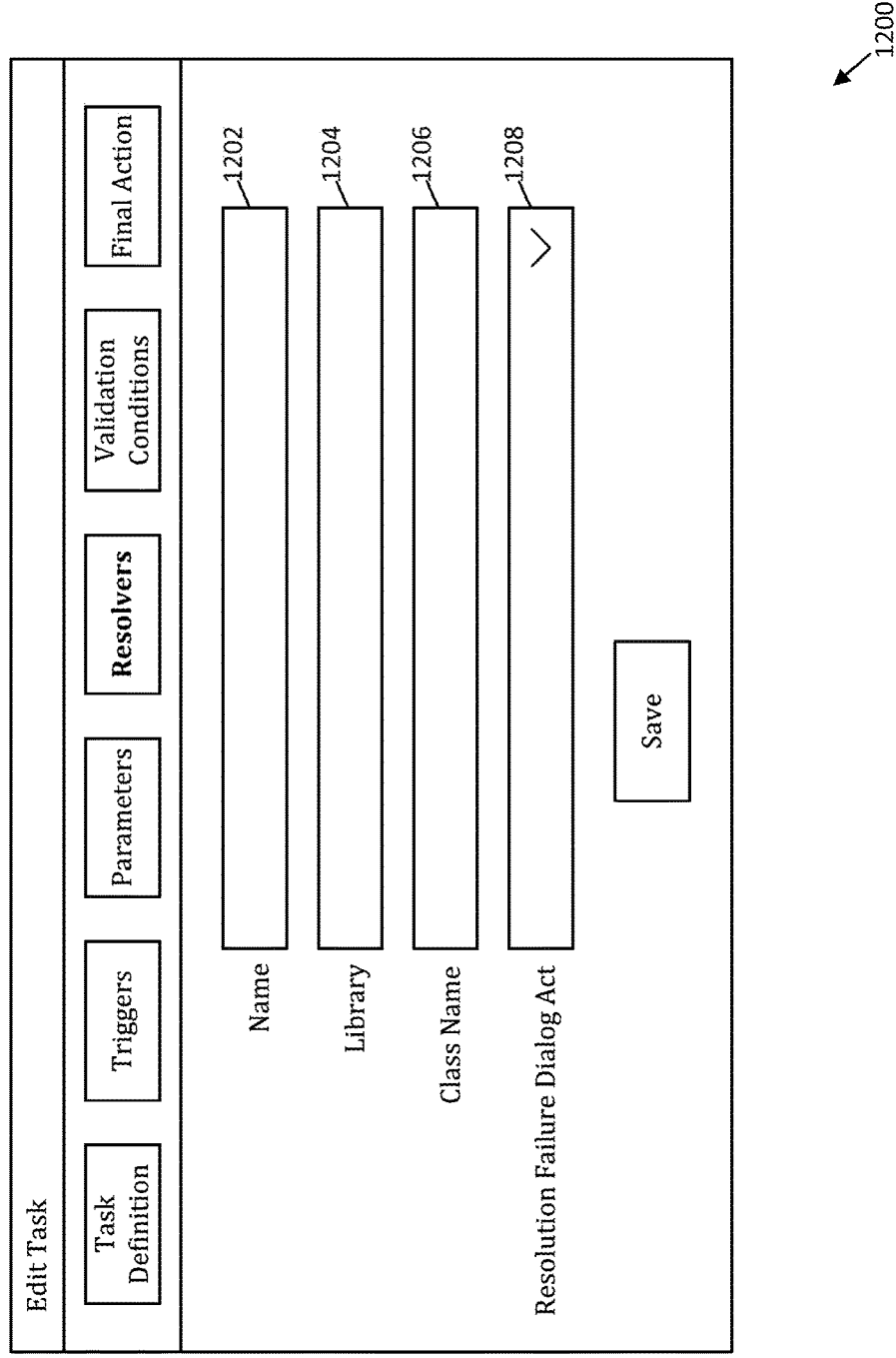
FIG. 12 illustrates an example screenshot of the user interface authoring platform for identifying resolvers.

FIG. 12 illustrates an example screenshot of the user interface authoring platform for identifying resolvers as described with reference to the identify resolvers operation 812 of FIG. 8. As illustrated in the example screenshot 1200, the user interface authoring platform 106 includes a menu 1202 for providing or selecting one or more suggested resolvers and a menu 1204 for providing the directory path of the library in which the suggested resolver resides. The user interface authoring platform 106 may also include a menu 1206 for providing the specific function name or the class name within the suggested resolver library. Still further, the user interface authoring platform 106 may include menu 1208 for defining a dialog act that may be, for example, a resolution failure prompt dialog act that indicates whether a parameter cannot be resolved. In some aspects, the menu 1208 is a drop-down menu including one or more failure prompt strings from which an author may select. In a further example, once selected, the failure prompt string may be displayed to the author, allowing the author to view each suggested failure prompt string from menu 1308 and a corresponding user experience/interface.

It is understood that FIG. 12 is merely exemplary and that various menus 1202-1208 may each be drop-down menus of possible dialog acts from which the author may select. There may also be an associated selection button such as an "Add" button allowing the author to add the suggested dialog act from one of the menus 1202-1208. In such an example, once a suggested dialog act is added, that dialog act may be shown in the display, allowing the author to view each suggested dialog act. There may also be additional functionality allowing the author to define one or more associated user interfaces, as described herein with reference to the identify resolvers operation 212. It is therefore understood that FIG. 12 is merely exemplary and is not intended to limit the present disclosure to the illustrated configuration.

Figure 13:
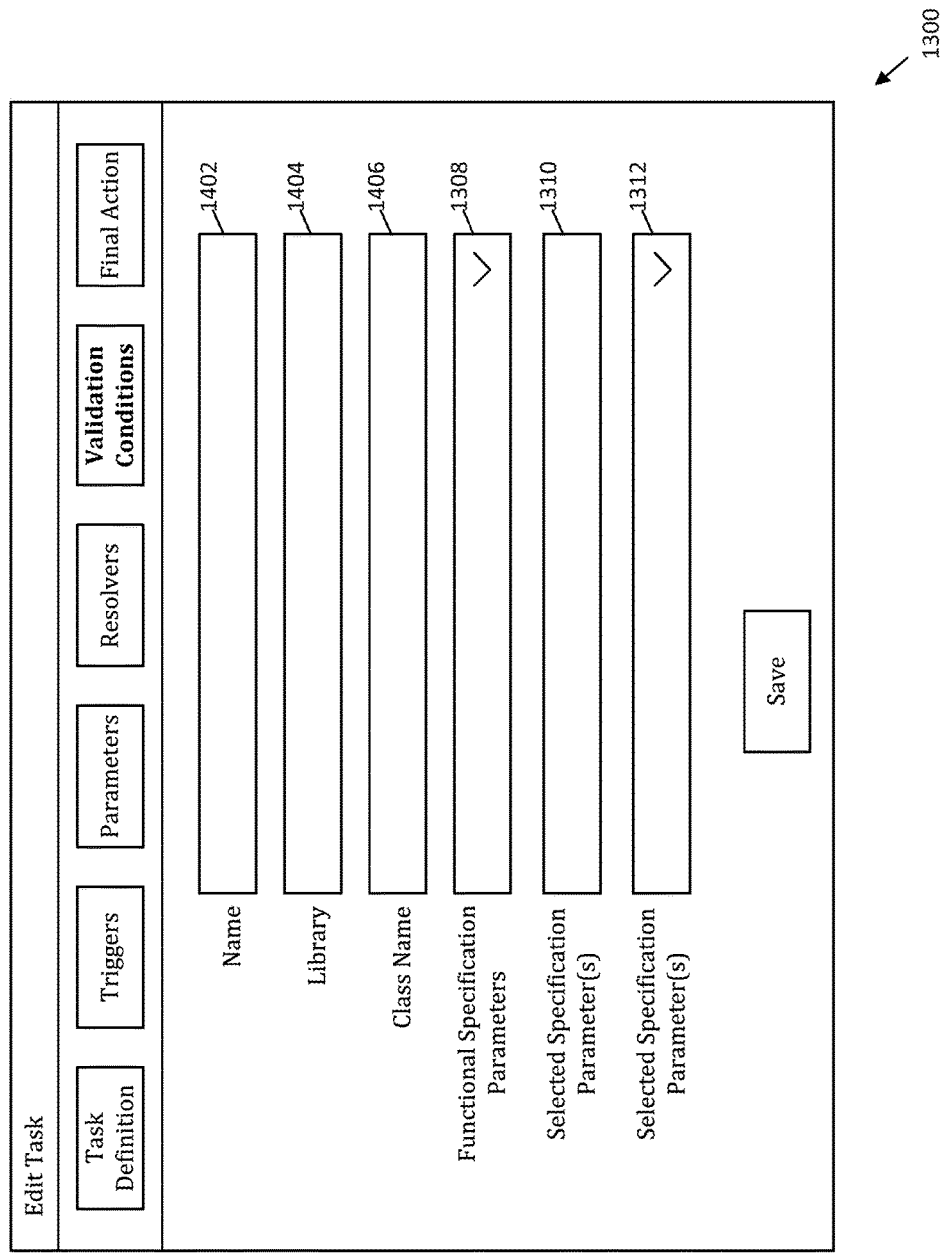
FIG. 13 illustrates an example screenshot of the user interface authoring platform for identifying validation conditions.

FIG. 13 illustrates an example screenshot 1300 of the user interface authoring platform 106 for identifying validation conditions as described with reference to the identify validation conditions operation 814 of FIG. 8. As described herein, the user interface authoring platform 106 further provides the ability to confirm suggested validation conditions, which define the one or more valid conditions that must exist among one or more parameters for the suggested task execution. As illustrated in the example screenshot 1300, the user interface authoring platform 106 includes a menu 1302 for confirming the suggested name of the condition and a corresponding menu 1304 for providing the directory path of the library in which the selected validation condition resides. The user interface authoring platform 107 may also include a menu 1306 for providing the specific function name or the class name within the identified validation conditions library. In an example, once the value in menu 1306 for providing the specific name is suggested, a dropdown 1308 and text box 1310 may appear. For example, a drop-down menu 1308 may contain additional functional specification parameters required to be provided in order to fully implement the function. Selecting each parameter from menu 1308 may produce the value corresponding to that parameter in text box 1310, allowing the author to edit or otherwise modify the value or provide a new one if not provided. Additionally, menu 1312 may list all the parameters of the task as specified in FIG. 11. The author can select one or more parameters of the task from drop-down menu 112 to use as input parameters to the validation function.

Figure 14:
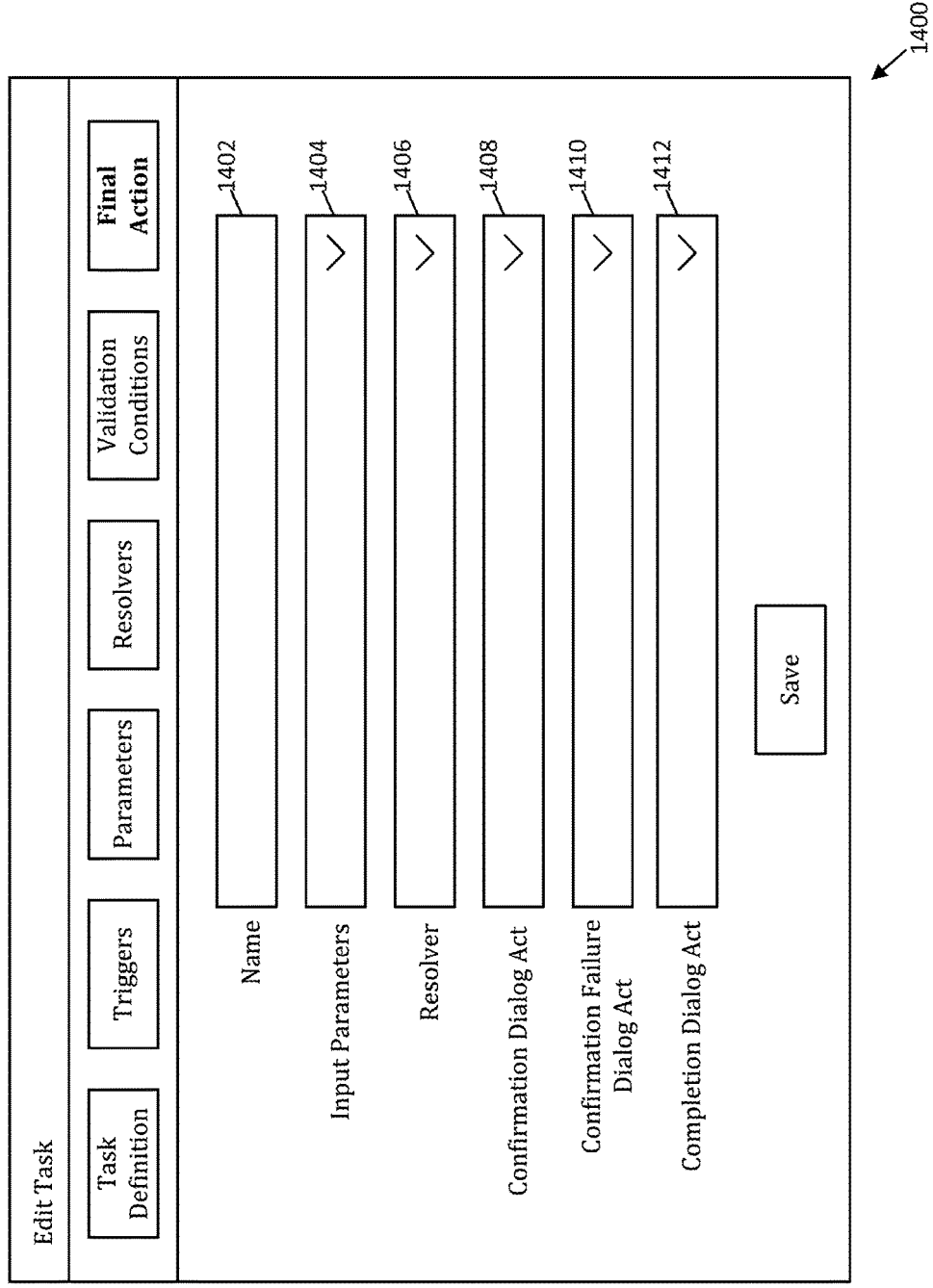
FIG. 14 illustrates an example screenshot of the user interface authoring platform for confirming the final action

FIG. 14 illustrates an example screenshot of the user interface authoring platform for confirming the final action as described with reference to the final task confirmation operation 816 of FIG. 2. As illustrated in the example screenshot 1400, the user interface authoring platform 106 includes a text box 1402 for confirming the name of the suggested final action as well as a text box 1404 for providing a list of the required and optional input parameters for task execution. The user interface authoring platform 106 may further include a text box 1406 for confirming a resolver associated with suggested the final action. The user interface authoring platform 106 may further include a menu 1408 for defining a confirmation dialog act to be provided to the user prior to task execution. The user interface authoring platform 106 may further include a menu 1410 for confirming a suggested confirmation failure dialog action the event that the task is not executed. The user interface authoring platform 106 may further include a menu 1412 for confirming a completion dialog act.

Figure 15:
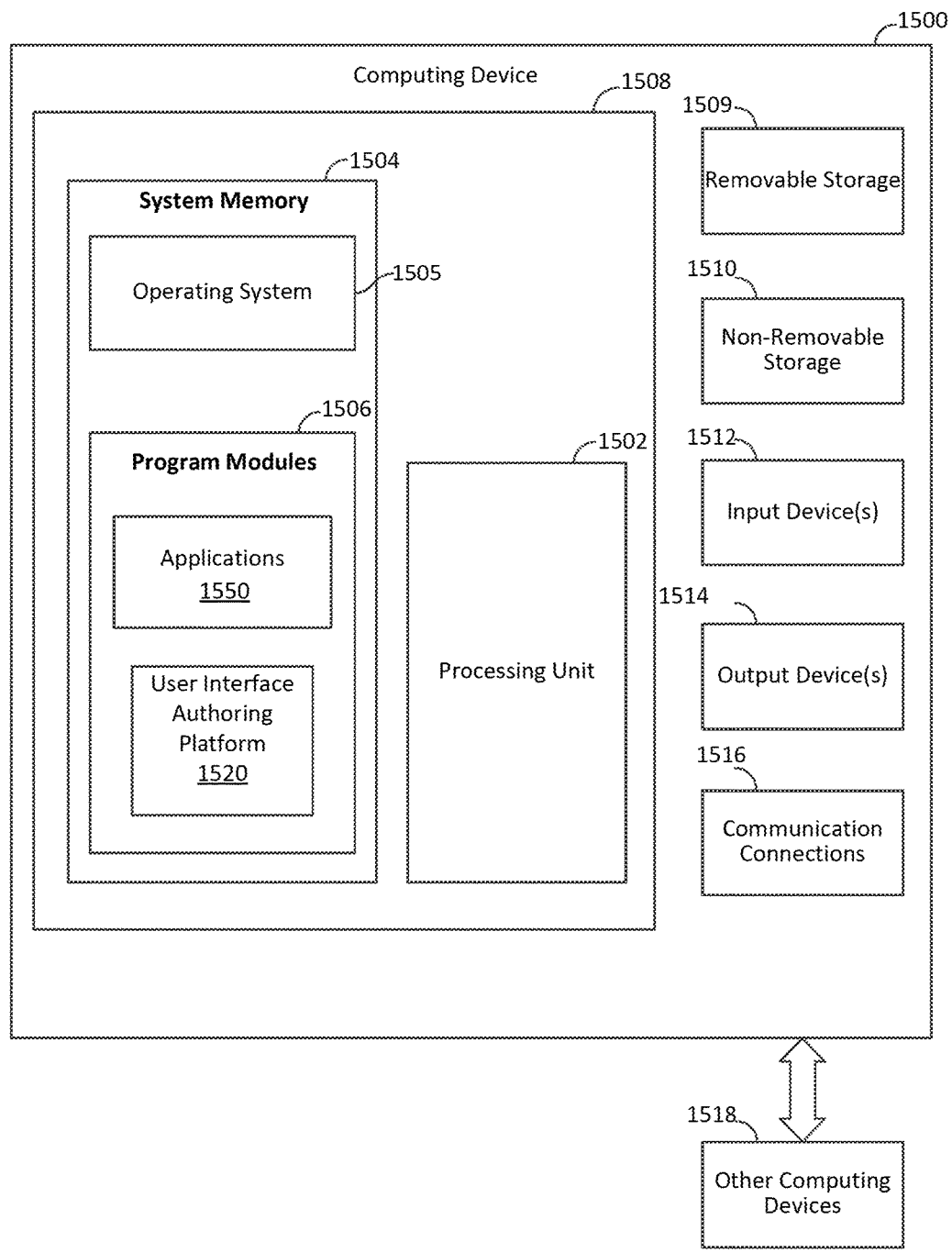
FIG. 15 is a block diagram illustrating physical components (e.g., hardware) of a computing device

FIG. 15 is a block diagram illustrating physical components (e.g., hardware) of a computing device 1500 with which aspects of the disclosure may be practiced. The computing device components described below may have computer executable instructions for implementing a user interface authoring platform 1520 on a computing device including computer executable instructions for the user interface authoring platform 1520 that can be executed to employ the methods disclosed herein. In a basic configuration, the computing device 1500 may include at least one processing unit 1502 and a system memory 1504. Depending on the configuration and type of computing device, the system memory 1504 may comprise, but is not limited to, volatile storage (e.g., random access memory), non-volatile storage (e.g., read-only memory), flash memory, or any combination of such memories. The system memory 1504 may include an operating system 1505 suitable for running the user interface authoring platform 1520 or one or more components in regards to FIG. 1. The operating system 1505, for example, may be suitable for controlling the operation of the computing device 1500. Furthermore, aspects of the disclosure may be practiced in conjunction with a graphics library, other operating systems, or any other application program and is not limited to any particular application or system. This basic configuration is illustrated in FIG. 15 by those components within a dashed line 1508. The computing device 1500 may have additional features or functionality. For example, the computing device 1500 may also include additional data storage devices (removable and/or non-removable) such as, for example, magnetic disks, optical disks, or tape. Such additional storage is illustrated in FIG. 15 by a removable storage device 1509 and a non-removable storage device 1510.

As stated above, a number of program modules and data files may be stored in the system memory 1504. While executing on the processing unit 1502, the program modules 1506 (e.g., user interface authoring platform 1520) may perform processes including, but not limited to, the aspects, as described herein. Other program modules that may be used in accordance with aspects of the present disclosure, and in particular for providing a user interface authoring platform.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 15 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1500 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 1500 may also have one or more input device(s) 1512 such as a keyboard, a mouse, a pen, a sound or voice input device, a touch or swipe input device, etc. The output device(s) 1514 such as a display, speakers, a printer, etc. may also be included. The aforementioned devices are examples and others may be used. The computing device 1500 may include one or more communication connections 1516 allowing communications with other computing devices 1550. Examples of suitable communication connections 1516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1504, the removable storage device 1509, and the non-removable storage device 1510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1500. Any such computer storage media may be part of the computing device 1500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 16A:
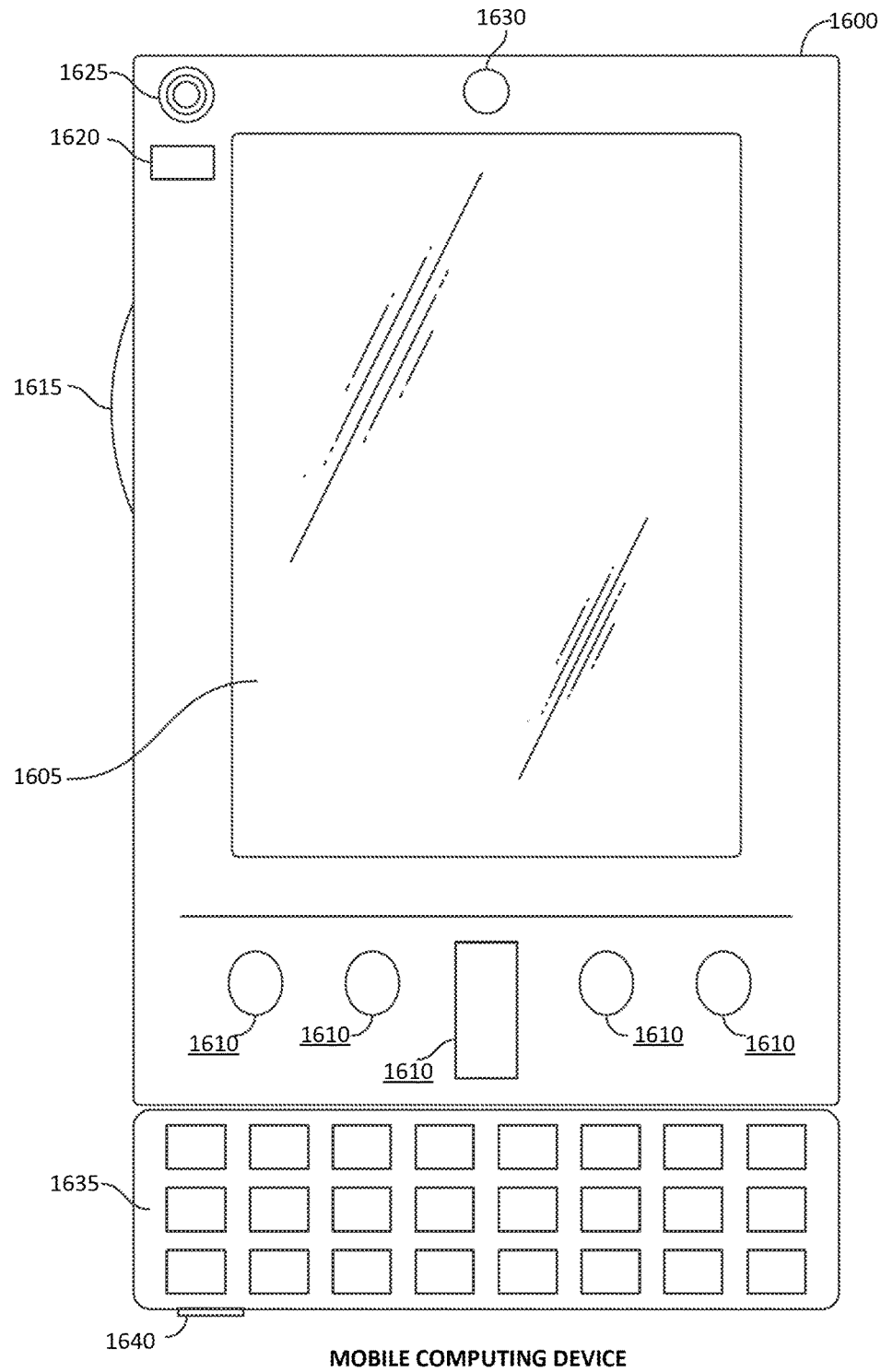
FIG. 16A and FIG. 16B illustrate a mobile computing device
Figure 16B:
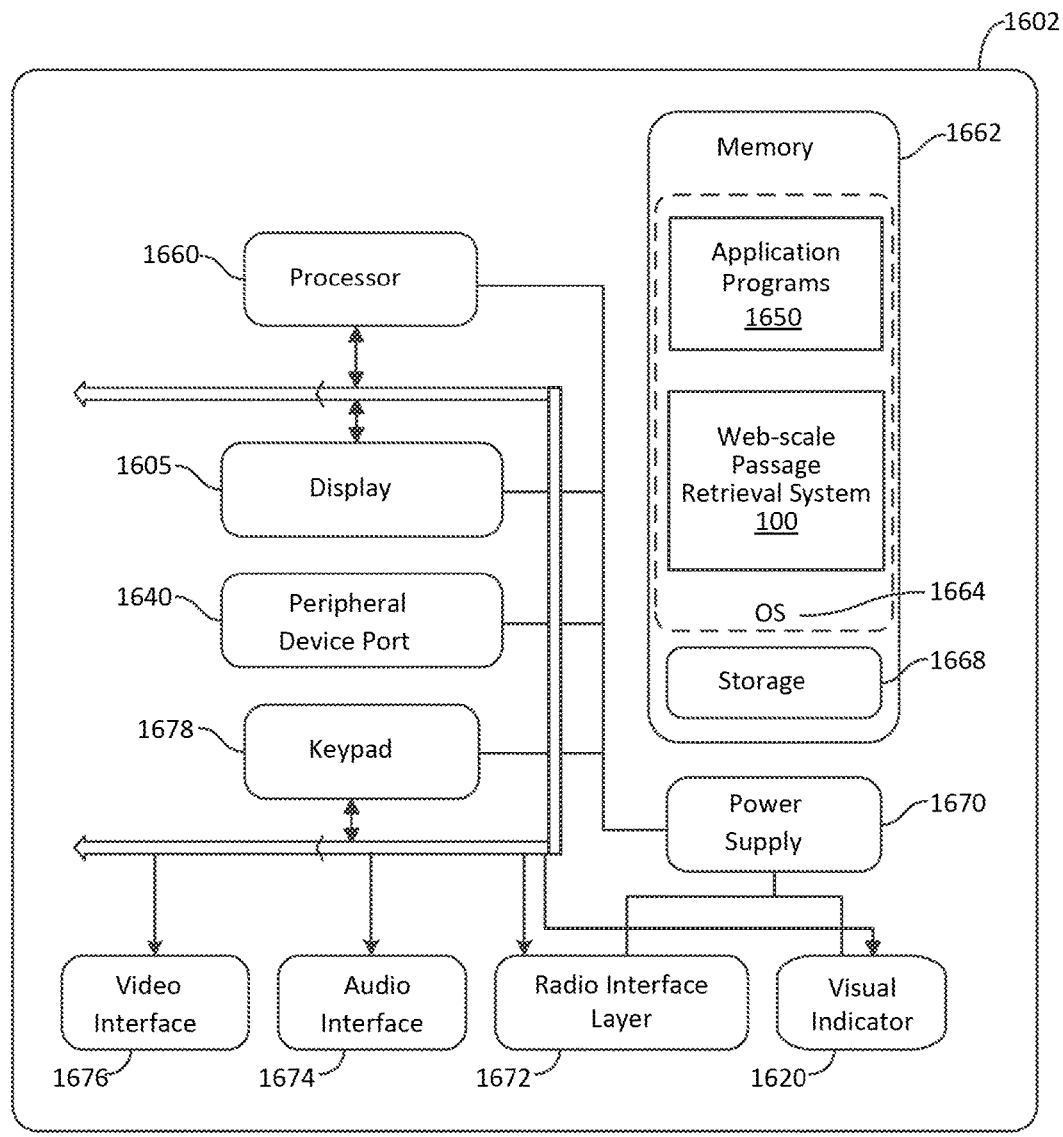

FIG. 16A and FIG. 16B illustrate a mobile computing device 1600, for example, a mobile telephone, a smart phone, wearable computer (such as a smart watch), a tablet computer, a laptop computer, and the like, with which aspects of the disclosure may be practiced. In some aspects, the client may be a mobile computing device. With reference to FIG. 16A, one aspect of a mobile computing device 1600 for implementing the aspects is illustrated. In a basic configuration, the mobile computing device 1600 is a handheld computer having both input elements and output elements. The mobile computing device 1600 typically includes a display 1605 and one or more input buttons 1610 that allow the user to enter information into the mobile computing device 1600. The display 1605 of the mobile computing device 1600 may also function as an input device (e.g., a touch screen display). If included, an optional side input element 1615 allows further user input. The side input element 1615 may be a rotary switch, a button, or any other type of manual input element. In alternative aspects, mobile computing device 1600 may incorporate more or less input elements. For example, the display 1605 may not be a touch screen in some aspects. In yet another alternative embodiment, the mobile computing device 1600 is a portable phone system, such as a cellular phone. The mobile computing device 1600 may also include an optional keypad 1635. Optional keypad 1635 may be a physical keypad or a "soft" keypad generated on the touch screen display. In various aspects, the output elements include the display 1605 for showing a graphical user interface (GUI), a visual indicator 1620 (e.g., a light emitting diode), and/or an audio transducer 1625 (e.g., a speaker). In some aspects, the mobile computing device 1600 incorporates a vibration transducer for providing the user with tactile feedback. In yet another aspect, the mobile computing device 1600 incorporates input and/or output ports, such as an audio input (e.g., a microphone jack), an audio output (e.g., a headphone jack), and a video output (e.g., a HDMI port) for sending signals to or receiving signals from an external device.

FIG. 16B is a block diagram illustrating the architecture of one aspect of a mobile computing device. That is, the mobile computing device 1600 can incorporate a system (e.g., an architecture) 1602 to implement some aspects. In one embodiment, the system 1602 is implemented as a "smart phone" capable of running one or more applications (e.g., browser, e-mail, calendaring, contact managers, messaging clients, games, and media clients/players). In some aspects, the system 1602 is integrated as a computing device, such as an integrated personal digital assistant (PDA) and wireless phone.

One or more application programs 1666 may be loaded into the memory 1662 and run on or in association with the operating system 1664. Examples of the application programs include phone dialer programs, e-mail programs, personal information management (PIM) programs, word processing programs, spreadsheet programs, Internet browser programs, messaging programs, and so forth. The system 1602 also includes a non-volatile storage area 1668 within the memory 1662. The non-volatile storage area 1668 may be used to store persistent information that should not be lost if the system 1602 is powered down. The application programs 1666 may use and store information in the non-volatile storage area 1668, such as e-mail or other messages used by an e-mail application, and the like. A synchronization application (not shown) also resides on the system 1602 and is programmed to interact with a corresponding synchronization application resident on a host computer to keep the information stored in the non-volatile storage area 1668 synchronized with corresponding information stored at the host computer. As should be appreciated, other applications may be loaded into the memory 1662 and run on the mobile computing device 1600, including the instructions for providing a user interface authoring platform as described herein.

The system 1602 has a power supply 1670, which may be implemented as one or more batteries. The power supply 1670 might further include an external power source, such as an AC adapter or a powered docking cradle that supplements or recharges the batteries.

The system 1602 may also include a radio interface layer 1672 that performs the function of transmitting and receiving radio frequency communications. The radio interface layer 1672 facilitates wireless connectivity between the system 1602 and the "outside world," via a communications carrier or service provider. Transmissions to and from the radio interface layer 1672 are conducted under control of the operating system 1664. In other words, communications received by the radio interface layer 1672 may be disseminated to the application programs 1666 via the operating system 1664, and vice versa.

The visual indicator 1620 may be used to provide visual notifications, and/or an audio interface 1674 may be used for producing audible notifications via the audio transducer 1625. In the illustrated embodiment, the visual indicator 1620 is a light emitting diode (LED) and the audio transducer 1625 is a speaker. These devices may be directly coupled to the power supply 1670 so that when activated, they remain on for a duration dictated by the notification mechanism even though the processor 1660 and other components might shut down for conserving battery power. The LED may be programmed to remain on indefinitely until the user takes action to indicate the powered-on status of the device. The audio interface 1674 is used to provide audible signals to and receive audible signals from the user. For example, in addition to being coupled to the audio transducer 1625, the audio interface 1674 may also be coupled to a microphone to receive audible input, such as to facilitate a telephone conversation. In accordance with aspects of the present disclosure, the microphone may also serve as an audio sensor to facilitate control of notifications, as will be described below. The system 1602 may further include a video interface 1676 that enables an operation of an onboard camera 1630 to record still images, video stream, and the like.

A mobile computing device 1600 implementing the system 1602 may have additional features or functionality. For example, the mobile computing device 1600 may also include additional data storage devices (removable and/or non-removable) such as, magnetic disks, optical disks, or tape. Such additional storage is illustrated in FIG. 16B by the non-volatile storage area 1668.

Data/information generated or captured by the mobile computing device 1600 and stored via the system 1602 may be stored locally on the mobile computing device 1600, as described above, or the data may be stored on any number of storage media that may be accessed by the device via the radio interface layer 1672 or via a wired connection between the mobile computing device 1600 and a separate computing device associated with the mobile computing device 1600, for example, a server computer in a distributed computing network, such as the Internet. As should be appreciated such data/information may be accessed via the mobile computing device 1600 via the radio interface layer 1672 or via a distributed computing network. Similarly, such data/information may be readily transferred between computing devices for storage and use according to well-known data/information transfer and storage means, including electronic mail and collaborative data/information sharing systems.

Figure 17:
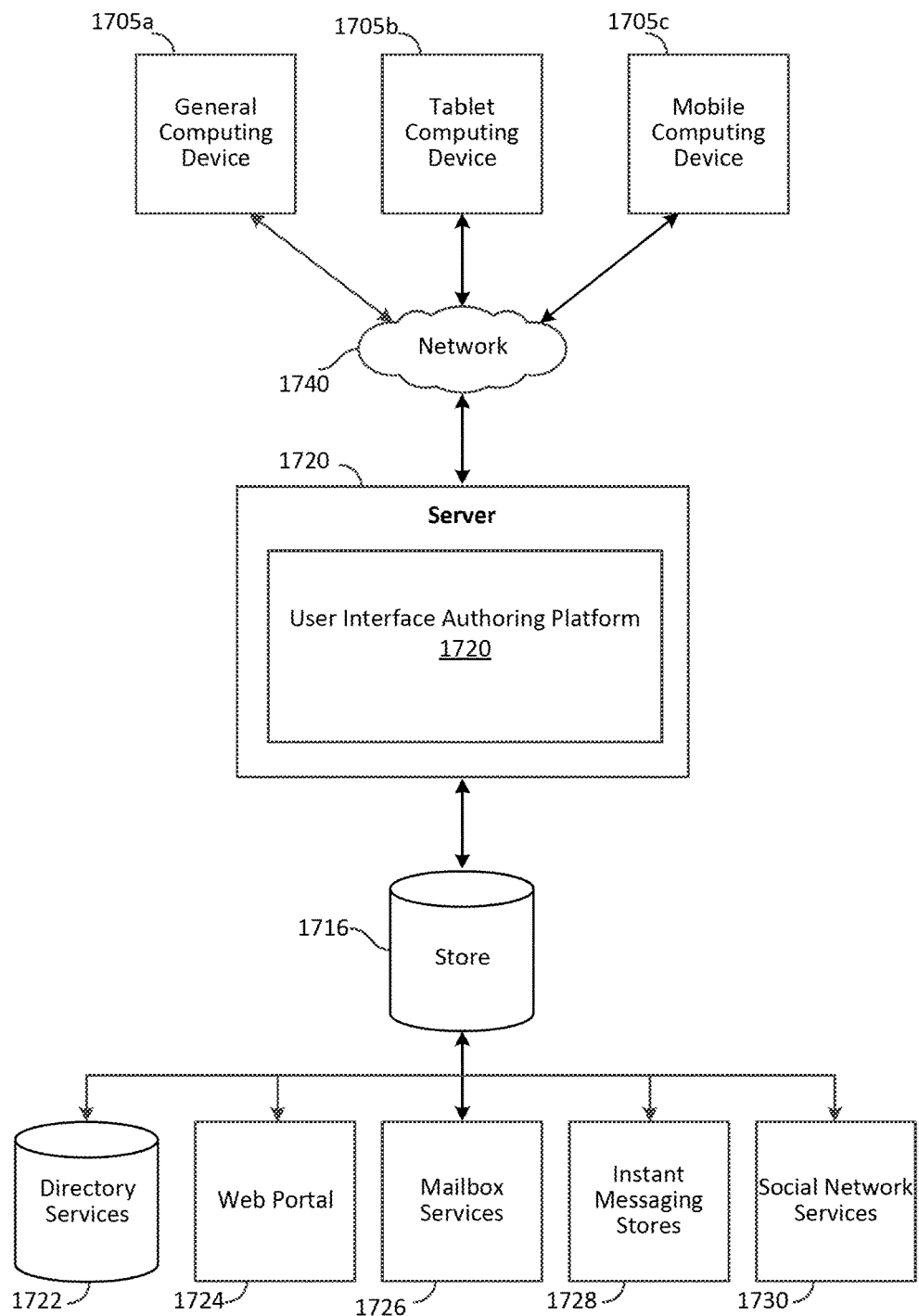
FIG. 17 illustrates one aspect of the architecture of a system for processing data received at a computing system from a remote source

FIG. 17 illustrates one aspect of the architecture of a system for processing data received at a computing system from a remote source, such as a personal computer 1704, tablet computing device 1706, or mobile computing device 1708, as described above. Content displayed at server device 1702 may be stored in different communication channels or other storage types. For example, various documents may be stored using a directory service 1722, a web portal 1724, a mailbox service 1726, an instant messaging store 1728, or a social networking site 1730. The user interface authoring platform 1720 may be employed by a client that communicates with server device 1702, and/or the user interface authoring platform may be employed by server device 1702. The server device 1702 may provide data to and from a client computing device such as a personal computer 1704, a tablet computing device 1706 and/or a mobile computing device 1708 (e.g., a smart phone) through a network 1715. By way of example, the computer system described above with respect to FIGS. 1-9 may be embodied in a personal computer 1704, a tablet computing device 1706 and/or a mobile computing device 1708 (e.g., a smart phone). Any of these aspects of the computing devices may obtain content from the store 1216, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The various aspects described above are provided by way of illustration only and should not be construed to limit the claims attached hereto. Those skilled in the art will readily recognize various modifications and changes that may be made without following the example aspects and applications illustrated and described herein, and without departing from the true spirit and scope of the following claims.

The invention claimed is:

1. A computer method, the method comprising:
parsing a webpage to identify an element;
determining a domain of the webpage;
determining a suggested task, wherein determining the suggested task comprises:
identifying one or more existing conversational understanding systems that are associated with the determined domain;
based on the parsed webpage, determining an action associated with the element; and
comparing the action to one or more existing tasks for the identified one or more existing conversational understanding systems to identify the suggested task;
providing, via a user interface, the suggested task to an authoring platform; and
receiving, via the user interface, confirmation to use the suggested task to enable a user to vocally interact with the webpage.

2. The method of claim 1, further comprising:
parsing the webpage to identify at least one parameter; and
mapping the at least one parameter to a task parameter associated with the suggested task.

3. The method of claim 2, further comprising:
determining that the parameter is associated with a placeholder entity of the suggested task; and
augmenting the conversational understanding system with the at least one parameter such that the parameter replaces the placeholder entity in the suggested task.

4. The method of claim 3, wherein augmenting the conversational understanding system comprises replacing, in a dialog, a placeholder entity with the at least one parameter.

5. The method of claim 4, further comprising providing the dialog to a client device.

6. The method of claim 1, further comprising:
executing an action of the webpage, wherein the execution results in navigating to a new webpage and presenting a message to a user, and further wherein the new webpage has a URL and the message includes text;
capturing the URL; and
storing the message text.

7. The method of claim 6, wherein executing the action of the webpage occurs by filling in sample information into a field of the webpage.

8. A system comprising:
at least one processor; and
memory storing instructions that, when executed by the at least one processor, cause the at least one processor to perform a method comprising:
determining a domain associated with a webpage, wherein the webpage comprises at least one actionable element;
determining a suggested task, wherein determining the suggested task comprises:
identifying one or more existing conversational understanding systems that are associated with the domain;
comparing the actionable element to one or more existing tasks for the identified one or more existing conversational understanding systems to identify the suggested task; and
providing, via a user interface, the suggested task to an authoring platform to confirm use of the suggested task, wherein use of the suggested task enables a user to vocally interact with the webpage.

9. The system of claim 8, further comprising:
determining that the parameter is associated with a placeholder entity of the suggested task; and
augmenting the conversational understanding system with the at least one parameter such that the parameter replaces the placeholder entity in the suggested task.

10. The system of claim 9, further comprising augmenting the conversational understanding system with the at least one parameter.

11. The system of claim 10, wherein augmenting the conversational understanding system comprises replacing, in a dialog, a placeholder entity with the at least on parameter.

12. The system of claim 11, further comprising providing the dialog to a client device.

13. The system of claim 8, further comprising:
executing an action of the webpage, wherein the execution results in navigating to a new webpage and presenting a message to a user, wherein the new webpage has a URL and the message includes text;
capturing the URL; and
storing the message text.

14. The system of claim 13, wherein executing the action of the webpage occurs by filling in sample information into a field of the webpage.

15. A computer-readable storage device storing instructions that, when executed, are capable of performing a method, the method comprising:
- parsing a webpage to identify an element on the webpage;
- determining a domain associated with the webpage;
- determining a suggested task, wherein determining the suggested task comprises:
  - identifying one or more existing conversational understanding systems that are associated with the determined domain;
  - based on the parsed webpage, determining an action associated with the element by navigating the webpage; and
  - comparing the action to one or more existing tasks for the identified one or more existing conversational understanding systems to identify the suggested task; and
- providing, via a user interface, the suggested task to an authoring platform to confirm use of the suggested task, wherein use of the suggested task enables a user to vocally interact with the webpage.

16. The computer-readable storage device of claim 15, further comprising:
- determining that the parameter is associated with a placeholder entity of the suggested task; and
- augmenting the conversational understanding system with the at least one parameter such that the parameter replaces the placeholder entity in the suggested task.

17. The computer-readable storage device of claim 16, further comprising:
- augmenting the conversational understanding system with the at least one parameter.

18. The computer-readable storage device of claim 17, wherein augmenting the conversational understanding system comprises replacing, in a dialog, a placeholder entity with the at least on parameter.

* * * * *